(12) United States Patent
Suzuki et al.

(10) Patent No.: US 7,917,272 B2
(45) Date of Patent: Mar. 29, 2011

(54) DECELERATION CONTROL APPARATUS AND METHOD FOR AUTOMOTIVE VEHICLE

(75) Inventors: Tatsuya Suzuki, Kanagawa (JP); Genpei Naitou, Yokohama (JP); Shinji Matsumoto, Kanagawa (JP); Tomohiro Jimbo, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/360,465

(22) Filed: Jan. 27, 2009

(65) Prior Publication Data
US 2009/0138164 A1    May 28, 2009

Related U.S. Application Data

(62) Division of application No. 11/072,497, filed on Mar. 7, 2005, now abandoned.

(30) Foreign Application Priority Data

Mar. 15, 2004   (JP) ................................. 2004-073125
Mar. 17, 2004   (JP) ................................. 2004-077033

(51) Int. Cl.
*F02D 13/04* (2006.01)
*F02D 9/06* (2006.01)
*B60W 10/18* (2006.01)
*B60T 8/72* (2006.01)

(52) U.S. Cl. ................ 701/70; 701/55; 701/71; 701/72; 701/73; 701/78; 701/82; 701/85; 123/349; 123/376; 477/203; 477/205; 477/206

(58) Field of Classification Search .......... 701/1, 36–48, 701/51–62, 64–66, 70–92; 73/114.36; 123/337; 180/335; 477/182, 203, 205, 206
See application file for complete search history.

(56) References Cited

U.S. PATENT DOCUMENTS

| 4,532,901 | A | * | 8/1985 | Sturdy | 123/333 |
| 4,592,322 | A | * | 6/1986 | Murakami et al. | 123/361 |
| 5,025,882 | A | * | 6/1991 | Ghoneim et al. | 180/197 |
| 5,077,672 | A | * | 12/1991 | Nobumoto et al. | 701/92 |
| 5,148,884 | A | * | 9/1992 | Tsuyama et al. | 180/197 |
| 5,276,624 | A | * | 1/1994 | Ito et al. | 701/72 |
| 5,281,008 | A | * | 1/1994 | Kawamura et al. | 303/141 |
| 5,309,362 | A | | 5/1994 | Ito et al. | |
| 5,437,586 | A | * | 8/1995 | Kashiwagi | 477/35 |
| 5,446,657 | A | * | 8/1995 | Ikeda et al. | 701/41 |
| 5,546,308 | A | * | 8/1996 | Yamamoto | 701/93 |

(Continued)

FOREIGN PATENT DOCUMENTS
DE    198 30 318 A1    1/1999
(Continued)

OTHER PUBLICATIONS

T. Suzuki et al., US PTO Office Action, U.S. Appl. No. 11/072,497, dated Apr. 19, 2007, 10 pgs.

(Continued)

*Primary Examiner* — Jack Keith
*Assistant Examiner* — Jonathan M Dager
(74) *Attorney, Agent, or Firm* — Foley & Lardner LLP

(57) ABSTRACT

In deceleration control apparatus and method for an automotive vehicle, a deceleration control is performed in accordance with a turning travel situation of the vehicle; and an engine throttle opening angle is controlled gradually in a closure direction at a preset variation degree.

24 Claims, 17 Drawing Sheets

U.S. PATENT DOCUMENTS

| | | | |
|---|---|---|---|
| 5,555,499 A | 9/1996 | Yamashita et al. | |
| 5,627,756 A | 5/1997 | Fukada et al. | |
| 5,731,977 A * | 3/1998 | Taniguchi et al. | 701/96 |
| 5,822,709 A * | 10/1998 | Fujita | 701/70 |
| 5,845,726 A * | 12/1998 | Kikkawa et al. | 180/178 |
| 5,852,330 A * | 12/1998 | Yumoto | 290/40 R |
| 5,893,896 A * | 4/1999 | Imamura et al. | 701/70 |
| 5,947,221 A | 9/1999 | Taniguchi et al. | |
| 6,076,034 A * | 6/2000 | Satoh et al. | 701/70 |
| 6,081,761 A | 6/2000 | Harada et al. | |
| 6,104,976 A * | 8/2000 | Nakamura | 701/95 |
| 6,161,641 A * | 12/2000 | Fukumura et al. | 180/197 |
| 6,219,602 B1 * | 4/2001 | Badenoch et al. | 701/37 |
| 6,266,600 B1 | 7/2001 | Miyazaki | |
| 6,272,416 B1 * | 8/2001 | Kuroda et al. | 701/70 |
| 6,305,757 B1 * | 10/2001 | Ohsaki et al. | 303/114.3 |
| 6,338,392 B1 | 1/2002 | Schmitt | |
| 6,392,535 B1 * | 5/2002 | Matsuno et al. | 340/441 |
| 6,405,116 B1 | 6/2002 | Koibuchi | |
| 6,577,941 B2 | 6/2003 | Kawasaki et al. | |
| 6,659,570 B2 | 12/2003 | Nakamura | |
| 6,823,840 B1 * | 11/2004 | Tamai et al. | 123/352 |
| 2001/0056318 A1 * | 12/2001 | Tashiro et al. | 701/48 |
| 2002/0095255 A1 * | 7/2002 | Minowa et al. | 701/96 |
| 2002/0109402 A1 | 8/2002 | Nakamura | |
| 2002/0152015 A1 * | 10/2002 | Seto | 701/96 |
| 2003/0045991 A1 | 3/2003 | Isogai et al. | |
| 2003/0125864 A1 * | 7/2003 | Banno et al. | 701/84 |
| 2003/0154016 A1 * | 8/2003 | Manaka | 701/96 |
| 2004/0098186 A1 * | 5/2004 | Watanabe et al. | 701/72 |
| 2005/0085985 A1 | 4/2005 | Suzuki et al. | |

FOREIGN PATENT DOCUMENTS

| | | |
|---|---|---|
| DE | 199 05 034 A1 | 9/1999 |
| EP | 0 941 902 A2 | 9/1999 |
| JP | 10-278762 A | 10/1998 |
| JP | 2001-334920 A | 12/2001 |
| JP | 2002-127888 A | 5/2002 |

OTHER PUBLICATIONS

T. Suzuki et al., US PTO Office Action, U.S. Appl. No. 11/072,497, dated Jun. 9, 2008, 7 pgs.

T. Suzuki et al., US PTO Office Action, U.S. Appl. No. 11/072,497, dated Oct. 2, 2007, 10 pgs.

T. Suzuki et al., US PTO Office Action, U.S. Appl. No. 11/072,497, dated Oct. 28, 2008, 13 pgs.

T. Suzuki et al., US PTO Office Action, U.S. Appl. No. 11/072,497, dated Dec. 21, 2006, 7 pgs.

* cited by examiner

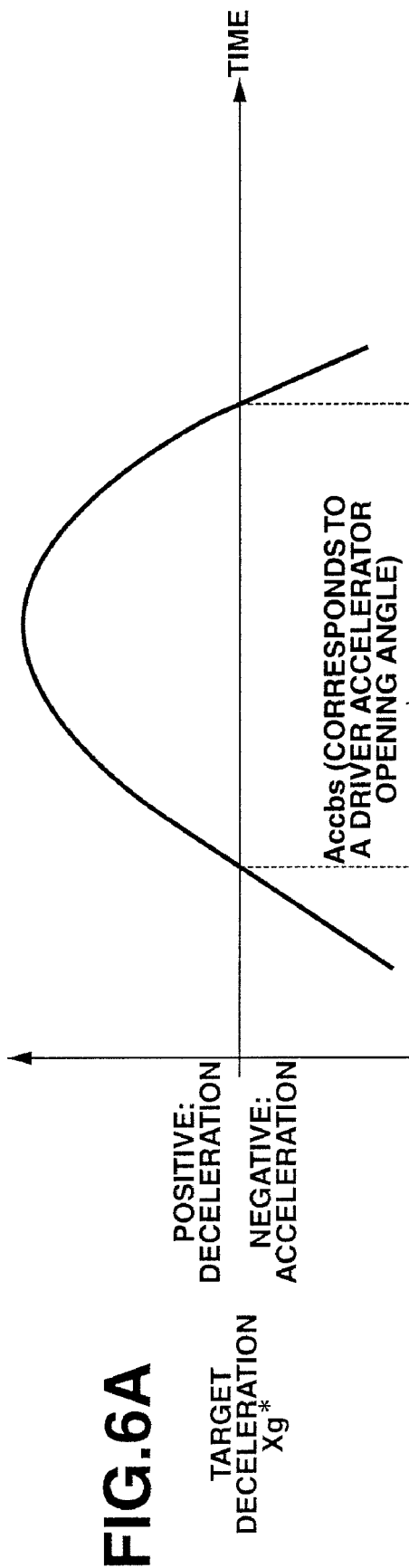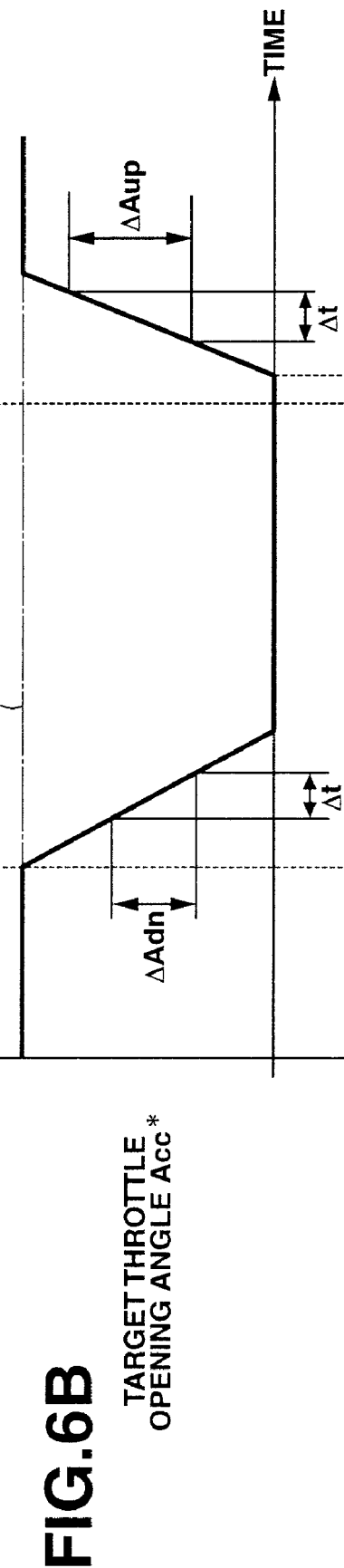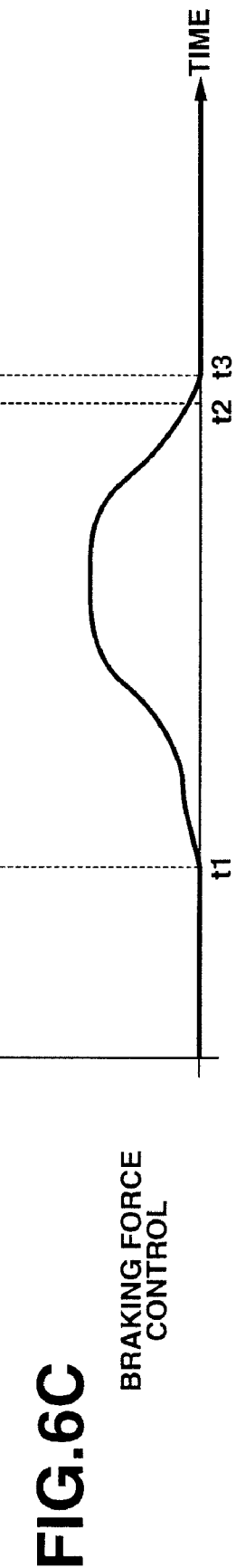

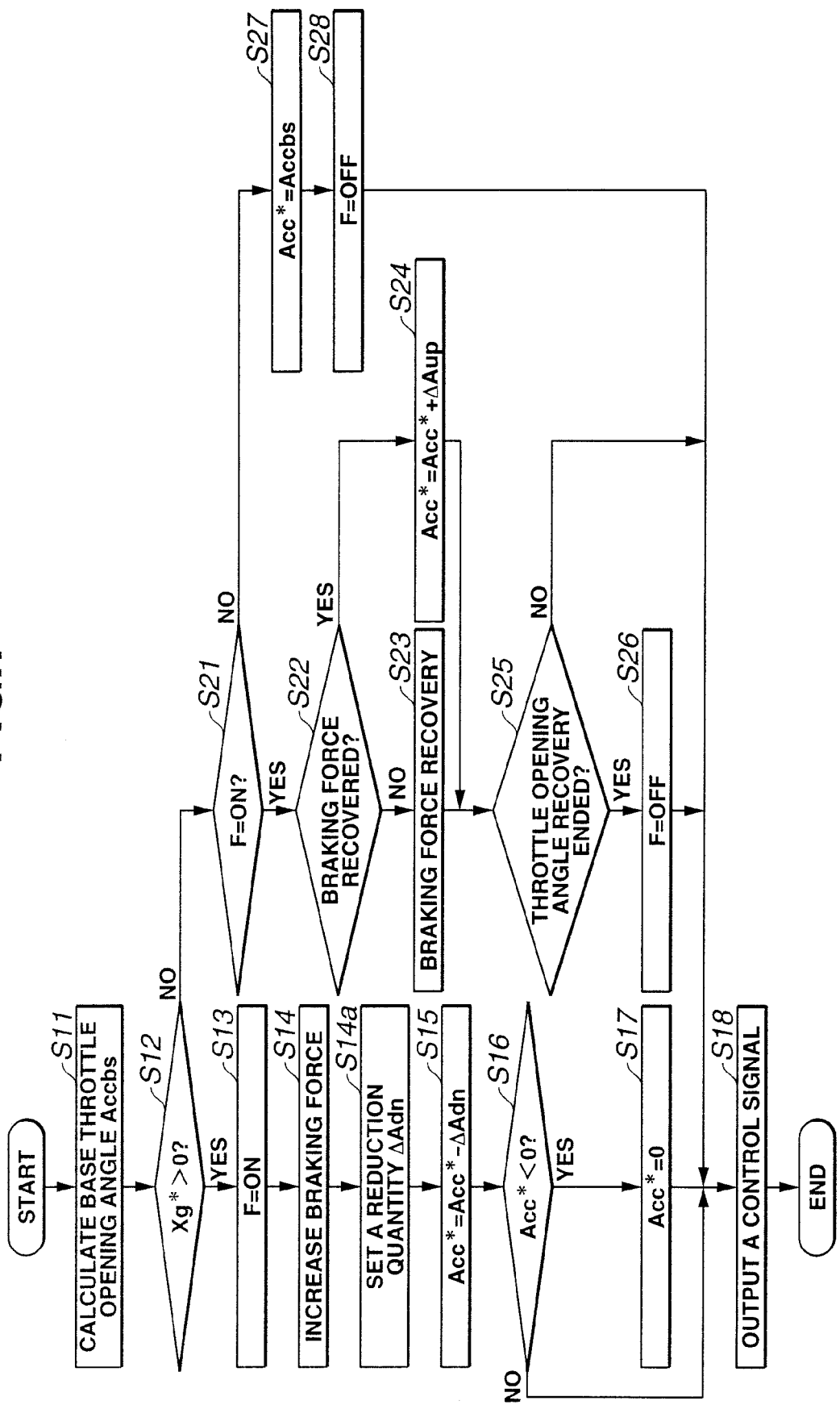

DECELERATION CONTROL APPARATUS AND METHOD FOR AUTOMOTIVE VEHICLE

The present application is a divisional of U.S. application Ser. No. 11/072,497, filed Mar. 7, 2005, the entire contents of which is incorporated herein by reference.

BACKGROUND OF THE INVENTION

1. Field of the Invention

The present invention relates to deceleration control apparatus and method for an automotive vehicle which perform a deceleration control of a vehicle which is turning on a curved road.

2. Description of the Related Art

A Japanese Patent Application First Publication No. Heisei 10-278762 published on Oct. 20, 1998 (which corresponds to a U.S. Pat. No. 6,081,761 issued on Jun. 27, 2000) exemplifies a first previously proposed deceleration control apparatus. In the first previously proposed deceleration control apparatus, a safe vehicle speed is calculated from a vehicle motion state or driving operation situation of the vehicle which is running on a curved road or is turning on a corner and, in a case where an actual vehicle speed is in excess of the calculated safe speed, the vehicle is automatically decelerated below the safe speed so that a spin, drift out, or a roll over is prevented from occurring. A Japanese Patent Application First Publication No. 2002-127888 published on May 9, 2002 exemplifies a second previously proposed deceleration control apparatus. In the second previously proposed deceleration control apparatus, in order to avoid a mutual interference between a brake side and a drive side when a vehicular motion is controlled by performing a control intervention irrespective of a driver driving operation as described above, a vehicular motion control is ended, for example, when a driver's accelerator pedal manipulated variable has an increase tendency.

SUMMARY OF THE INVENTION

As described above, in order to avoid the mutual interference between the brake side and the drive side, the vehicular motion control is ended when the driver's accelerator pedal is ended when the driver's accelerator pedal manipulated variable has an increase tendency. Thus, the interference between a braking force and a driving force can be avoided. However, in this case, if the driver's accelerator pedal manipulated variable becomes the increase tendency under a state in which the deceleration control is needed to perform, the deceleration control is not performed and a sufficient deceleration effect cannot be achieved. In addition, in a case where the deceleration control is performed in order to avoid the interference between the brake side and the drive side, such a method that, in a case where the braking force is developed after a throttle valve is controlled to be closed irrespective of the driver manipulation in a case where the driver manipulates the accelerator pedal has been proposed. However, in this case, even though the deceleration effect is obtained, a state transfer occurs from a state in which the driver manipulates the accelerator pedal to a state in which the driving force is not obtained irrespective of the driver intention. Thus, there is a possibility that an unpleasant feeling is given to the driver since an acceleration feeling is not abruptly obtained.

It is, hence, an object of the present invention to provide deceleration control apparatus and method for the automotive vehicle which are capable of obtaining the sufficient deceleration effect while avoiding the interference between the driving force and the braking force caused by the deceleration control without diving the unpleasant feeling to the driver.

According to one aspect of the present invention, there is provided a deceleration control apparatus for an automotive vehicle, comprising: a deceleration controller that performs a deceleration control in accordance with a turning travel situation of the vehicle, the deceleration controller controlling an engine throttle opening angle gradually in a closure direction when starting the deceleration control.

According to another aspect of the present invention, there is provided a deceleration control apparatus for an automotive vehicle, comprising: a deceleration controlling section that performs a deceleration control in accordance with a turning travel situation of the vehicle; and a throttle opening angle controlling section that controls an engine throttle opening angle, the throttle opening angle controlling section controlling the throttle opening angle gradually in a closure direction at a preset variation degree.

According to a still another aspect of the present invention, there is provided a deceleration control method for an automotive vehicle, comprising: performing a deceleration control in accordance with a turning travel situation of the vehicle; and controlling an engine throttle opening angle gradually in a closure direction at a preset variation degree.

This summary of the invention does not necessarily describe all necessary features so that the present invention may also be sub-combination of these described features.

BRIEF DESCRIPTION OF THE DRAWINGS

FIGS. 6A, 6B, and 6C are integrally a timing chart for explaining an operation of the deceleration control apparatus shown in FIG. 1.

FIG. 7 is a flowchart representing the control signal output procedure in a second preferred embodiment of the deceleration control apparatus according to the present invention.

DETAILED DESCRIPTION OF THE PREFERRED EMBODIMENTS

Reference will hereinafter be made to the drawings in order to facilitate a better understanding of the present invention.

Figure 1:
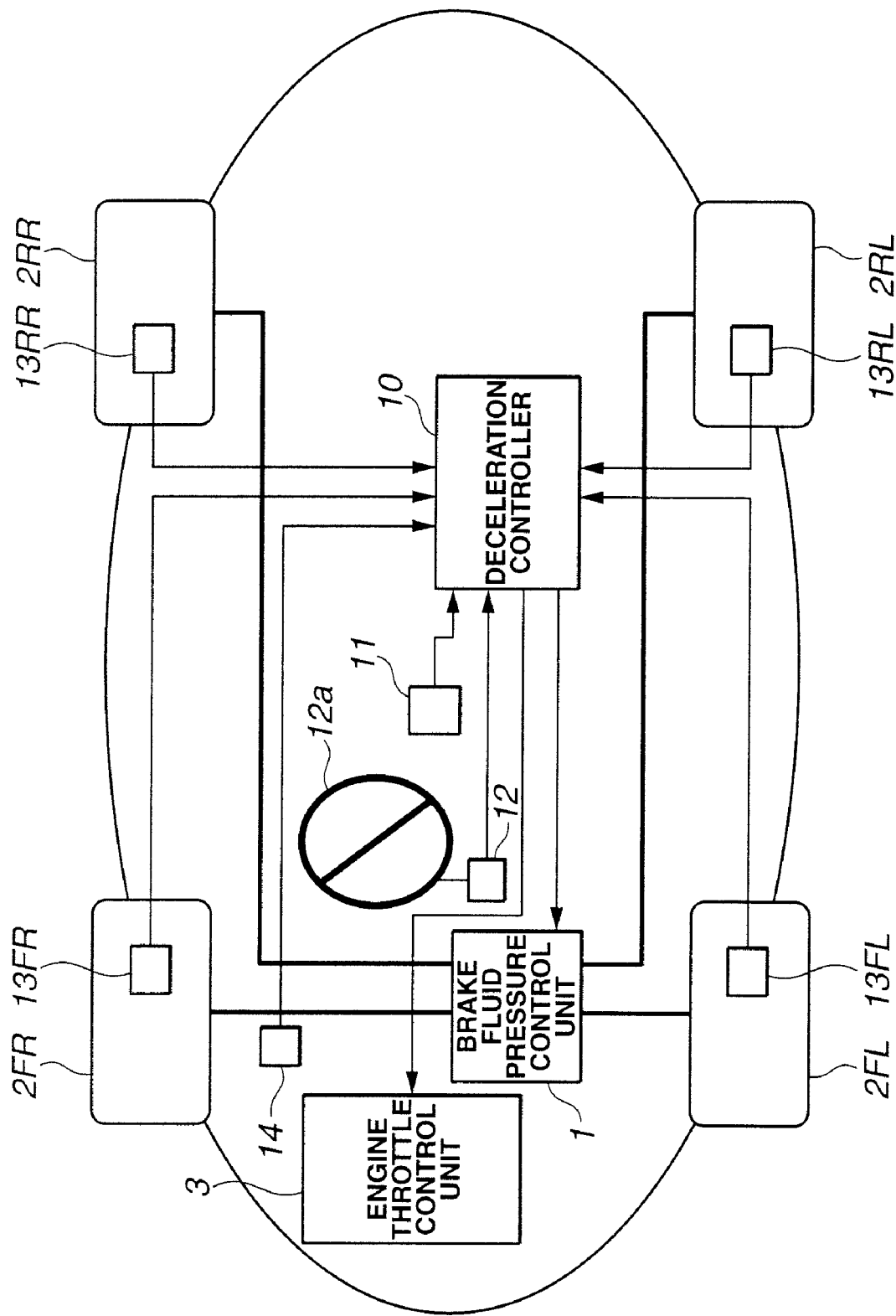
FIG. 1 is a schematic configuration view of an example of an automotive vehicle to which a deceleration control apparatus in a first preferred embodiment is applicable.

FIG. 1 shows a schematic configuration view of a vehicle to which a deceleration control apparatus in a first preferred embodiment according to the present invention is applicable. In FIG. 1, a reference numeral 1 denotes a braking fluid pressure control unit which controls a braking fluid pressure control unit to be supplied to each wheel cylinder (not shown) of a corresponding road wheel of road wheels 2FL, 2FR, 2RL, and 2RR. In other words, ordinarily, the braking fluid pressure boosted by means of a master cylinder is supplied to each wheel cylinder in accordance with a depression quantity (depth) of a brake pedal by a driver. However, braking fluid pressure control unit 1 interposed between the master cylinder and each wheel cylinder controls the braking fluid pressure for each wheel cylinder irrespective of the driver's manipulation on the bake pedal. Braking fluid pressure control unit 1 is a utilization of a braking fluid pressure control circuit used, for example, for an anti-skid control or a traction control. In addition, this braking fluid pressure control unit 1 controls the braking fluid pressure of each wheel cylinder in accordance with a braking fluid pressure command value from a deceleration controller 10 as will be described later. In FIG. 1, an engine throttle control unit 3 through which a throttle valve opening angle is controllable is disposed. This engine throttle control unit 3 can solely control the throttle valve. When the throttle opening angle command value is inputted from deceleration controller 10, the throttle valve is controlled by engine throttle control unit 3 in accordance with a throttle opening angle command value.

In addition, in the vehicle shown in FIG. 1, a yaw rate sensor 11 to detect a yaw rate $\phi'$ developed on the vehicle, a steering angle sensor 12 to detect a steering angle $\delta$ of a steering wheel 12a, road wheel velocity sensors 13FL, 13FR, 13RL, and 13RR to detect revolution speeds of respective road wheels 2FL through 2RR or, so-called, road wheel velocities Vwi (i=FL through RR), and an accelerator sensor (accelerator manipulated variable detecting means) to detect a depression quantity (depth) $\theta$th of an accelerator pedal (not shown) are installed. These detection signals are outputted to deceleration controller 10. Deceleration controller 10 performs deceleration control and calculation on the basis of various information inputted therein and generates a control signal to braking fluid pressure control unit 1 and engine throttle control unit 3.

Figure 2:
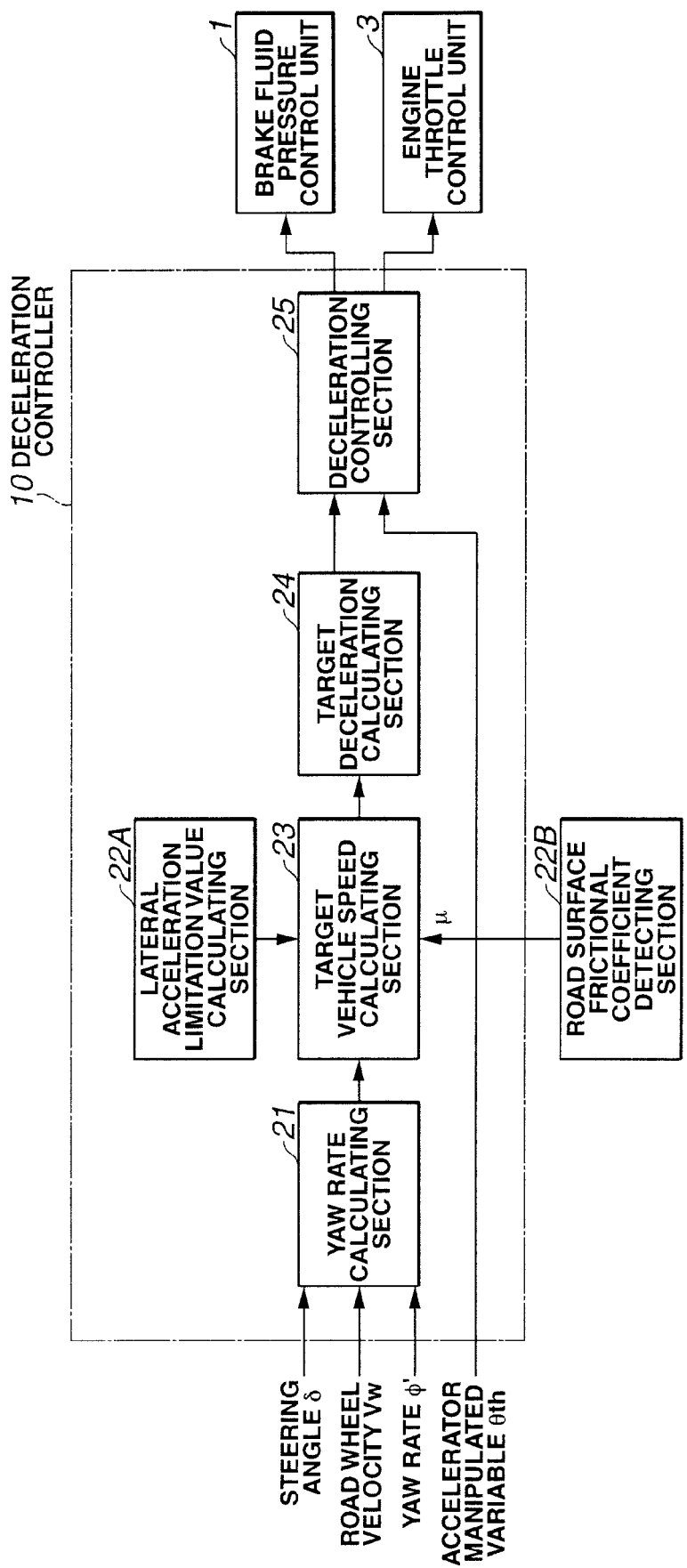
FIG. 2 is a functional block diagram of a deceleration controller shown in FIG. 1.

FIG. 2 shows a functional block diagram of deceleration controller 10. As shown in FIG. 2, deceleration controller 10 includes: a yaw rate calculating section 21 which calculates a yaw rate used for a calculation processing (yaw rate select value $\phi^*$ on the basis of steering angle $\delta$ from steering angle sensor 12, road wheel velocities VwFL through VwRR from road wheel velocity sensors 13FL through 13RR, and a yaw rate $\phi'$ from yaw rate sensor 11; a lateral acceleration limitation value calculating section 22A; a road surface frictional coefficient estimating section 23A that estimates a road surface frictional coefficient $\mu$ on the basis of the road wheel velocities VwFL through VwRR from road wheel velocity sensors 13FL through 13RR; a target vehicle speed calculating section 23 that calculates a target vehicle speed V* on the basis of a lateral acceleration limitation value Yg* calculated by lateral acceleration limitation value calculating section 22A and road surface frictional coefficient $\mu$ detected by a road surface frictional coefficient detecting section 22B; a target deceleration calculating section 24 that calculates a target deceleration Xg* on the basis of target vehicle speed V* calculated by target vehicle speed calculating section 23; and a deceleration controlling section 25 that drivingly controls braking fluid pressure control unit 1 and engine throttle control unit 3 to achieve target deceleration Xg* calculated by target deceleration calculating section 24.

Figure 3:
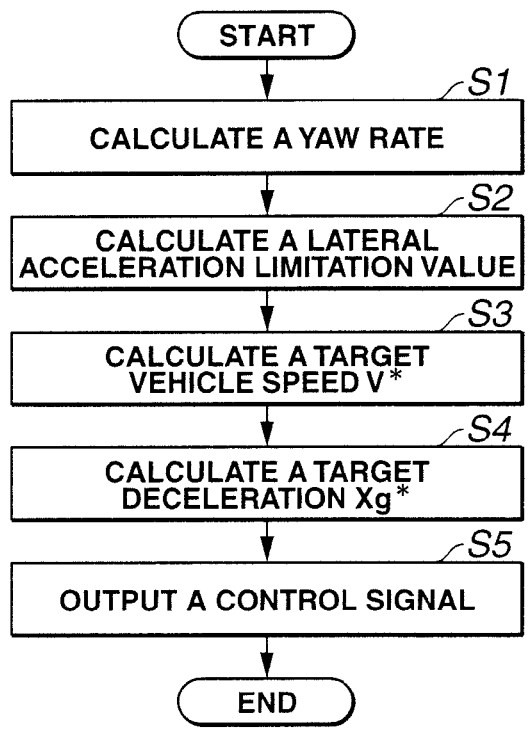
FIG. 3 is an operational flowchart representing an example of a calculation processing executed by the deceleration controller shown in FIG. 1.

Next, a processing procedure of calculation executed by deceleration controller 10 will be described with reference to a flowchart shown in FIG. 3. This calculation processing shown in FIG. 3 is executed in response to a timer interrupt for each of predetermined sampling times. It is noted that this flowchart does not provide a step for a communication and an information obtained by the calculation processing is at any time updated and stored in a random access memory device and the required information is read out from the random access memory device.

Figure 4:
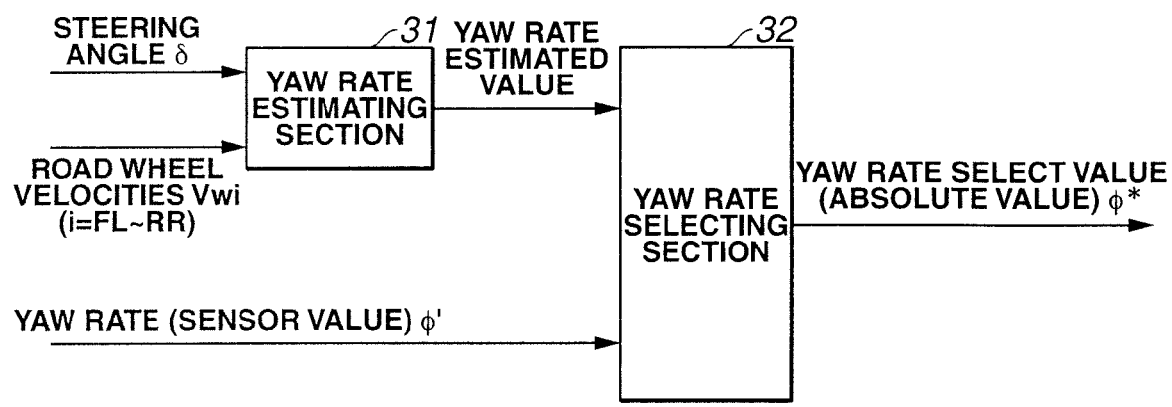
FIG. 4 is a block diagram of a yaw rate calculating section shown in FIG. 2.

As shown in FIG. 3, deceleration controller 10 calculates the yaw rate used for the calculation processing. This calculation of the yaw rate used for the calculation processing is carried out at yaw rate calculating section 21 shown in FIG. 2. Yaw rate calculating section 21, as shown in FIG. 4, includes: a yaw rate estimating section 31 that estimates the yaw rate on the basis of steering angle $\delta$ and road wheel velocities Vwi (i=FL, FR, RL, and RR); and a yaw rate selecting section 32 that selects one of yaw rate $\phi'$ detected by yaw rate sensor 11 and a yaw rate estimated value estimated by yaw rate estimating section 31 which is larger than the other.

Yaw rate estimating section 31 calculates a traveling velocity V of the vehicle on the basis of road wheel velocities Vwi detected by road wheel velocity sensors 13FL through 13RR and calculates yaw rate in a well known procedure on the basis of the traveling velocity V and steering angle $\delta$. It is noted that traveling velocity V may be derived by, for example, using an average value of the road wheel velocities of drive wheels. Yaw rate selecting section 32 selects one of yaw rate estimated value estimated by yaw rate estimating section 31 and yaw rate $\phi'$ detected by yaw rate sensor 11 whose absolute value is larger than the absolute value of the other. Selected value $\phi^*$ ($\phi^*>0$) of the yaw rate is the yaw rate used for the calculation processing.

It is noted that, in a case where the yaw rate is developed on the vehicle, the yaw rate estimated value detected on the basis of steering angle δ by yaw rate estimating section 31 can be derived at a time earlier than the yaw rate detected by yaw rate sensor 11. However, in a low frictional coefficient road surface, a vehicular motion is often developed in a direction in which the yaw rate is increased even if the steering wheel is not so steered as in a case of a slow spin mode. To prevent this vehicular motion, in such a case as described above, yaw rate φ' detected by yaw rate sensor 11 is used so that the deceleration control is intervened at an early timing and, at an earlier stage, the deceleration control is started.

As described above, after the yaw rate select value φ* is calculated, the routine goes to a step S2. At step S2, deceleration controller 10 sets lateral acceleration limitation value Yg*. Lateral acceleration limitation value Yg* is set to, for example, about 0.45 [G]. This lateral acceleration limitation value Yg* is a limit value of a target lateral acceleration up to which the vehicle can travel within a curved road without developing a spin, a drift out, or a turnover (rollover). Then, the routine goes to a step S3 at which deceleration controller 10 calculates target vehicle speed V* on the basis of lateral acceleration limitation value Yg* calculated at step S2. This target vehicle speed V* is calculated in accordance with the following equation (1) on the basis of yaw rate select value φ* calculated at step S1, lateral acceleration limitation value Yg* calculated at step S2, and an estimated value μ of road surface frictional coefficient.

$$V^* = (\mu \times Yg^*)/\phi^* \quad (1).$$

It is noted that detected value μ of the road surface frictional coefficient may be calculated by a well known procedure at road surface frictional coefficient detecting section 22B or a sensor to detect the road surface frictional coefficient and a sensor output may be used for detected value μ of the road surface frictional coefficient.

That is to say, the road surface frictional coefficient μ is, for example, detected by detecting front left or right road wheel and rear left or right road wheel velocities Vwi, calculating a tire first slip ratio (a ratio between road wheel velocities of the front and rear road wheels), performing a moving average of a vehicular acceleration or deceleration and the first slip ratio for a predetermined period of time, performing a further moving average to derive a weight moving average value for the moving average value derived as described above, deriving a relation equation between the vehicular acceleration or deceleration of the weight moving average value and a second slip ratio, and determining the frictional coefficient between the road surface and each road wheel on the basis of a gradient of the relation equation derived as described above. This is described in a Japanese Patent Application First Publication No. 2001-334920 published on Dec. 4, 2001 (which corresponds to a U.S. Pat. No. 6,577,941 issued on Jun. 10, 2003, the disclosure of which is herein incorporated by reference). Alternatively, road surface frictional coefficient μ may be derived from an output signal of a special sensor as disclosed in a U.S. Pat. No. 6,266,600 issued on Jul. 24, 2001 (the disclosure of which is herein incorporated by reference). Then, as appreciated from equation (1), target vehicle speed V* becomes smaller as road surface frictional coefficient becomes smaller so that a control intervention tends to become easy. In the same way, target vehicle speed V* becomes smaller as lateral acceleration limitation value Yg* becomes smaller so that the control intervention tends to become easy. In the same way, target vehicle speed V* becomes smaller as yaw rate select value φ* becomes larger so that the control intervention tends to become easy.

Next, the routine goes to a step S4. At step S4, deceleration controller 10 calculates a target deceleration Xg*. Specifically, target deceleration Xg* is calculated from the following equation (2) on the basis of a vehicle speed deviation ΔV (=V−V*) which is a difference between traveling velocity V calculated at step S1 and target vehicle speed V* calculated at step S3.

$$Xg^* = K \times \Delta V / \Delta t \quad (2).$$

In equation (2), K denotes a preset gain, Δt denotes a preset predetermined period of time and a required time to make vehicle speed deviation ΔV zero. In other words, target deceleration Xg* is set to become larger as the vehicle speed deviation ΔV between traveling velocity V and target vehicle speed V* becomes larger in the positive direction. It is noted that target deceleration Xg* is a deceleration side when Xg*>0.

It is noted that, although the case where target deceleration Xg* is calculated on the basis of vehicle speed deviation ΔV has been explained, target deceleration Xg* may be set from the following equation (3) with a difference value of vehicle speed deviation ΔV taken into consideration.

$$Xg^* = (K1 \times \Delta V + K2 \times d\Delta V)/\Delta t \quad (3).$$

In equation (3), K1 and K2 denote preset gains, dΔV=[ΔV(t)−ΔV(t−1)], ΔV(t) denotes a present vehicle speed deviation, ΔV(t−1) denotes a vehicle speed deviation before one calculation period, and ΔV>0.

As described above, with the difference value of vehicle speed deviation ΔV taken into consideration, for example, in a case where the steering is carried out at a relatively fast speed, an increase quantity of target deceleration Xg* with respect to a variation quantity of yaw select value φ* becomes increased. Hence, in a case where, for example, the vehicle driver makes a quick steering operation, the target deceleration responds to this steering operation quickly and increases instantaneously. Consequently, a quick deceleration control can be carried out in response to the steering operation by the vehicle driver.

Next, the routine goes to a step S5. At step S5, deceleration controller 10 generates a control signal to drivingly control brake fluid pressure control unit 1 and engine throttle control unit 3 so that an actual deceleration gives target deceleration Xg* calculated at step S4 and outputs the control signal to each control unit 1 and 3. Specifically, as shown in a flowchart of FIG. 5, first, at a step S11, deceleration controller 10 calculates a throttle opening angle corresponding to a depression quantity (depth) θth of accelerator pedal on the basis of the depression quantity of the accelerator pedal from an accelerator sensor 14 and sets this throttle opening angle to be a base throttle opening angle Accbs. It is noted that, in this flowchart of FIG. 5, as base throttle opening angle Accbs, the throttle opening angle in accordance with the depression quantity θth of accelerator pedal. However, in a case where a driving force control means (section) controls the throttle valve opening angle, for example, by means of an inter-vehicle distance control such that the vehicle is following a preceding vehicle maintaining an inter-vehicle distance between the vehicle and the preceding vehicle at a predetermined distance or by means of a traveling control process such that the vehicle speed control is carried out so that the vehicle can travel at a predetermined vehicle speed, a target value of the throttle valve according to the inter-vehicle distance control or speed control may be set as base throttle opening angle Accbs.

Next, the routine goes to a step S12. Deceleration controller 10 determines whether target deceleration Xg* calculated at step S4 is larger than zero (Xg*>0), namely, at the deceleration side. If Xg*>0 (Yes), the routine goes to a step S13. At step S13, deceleration controller 10 sets a deceleration control flag F representing whether the control intervention by means of the deceleration control is carried out to "ON" and the routine goes to a step S14. At step S14, deceleration controller 10 performs a braking force increase processing. In details, at step S14, deceleration controller 10 generates the control signal for brake fluid pressure control unit 1 to achieve target deceleration Xg* only by means of a driving force control. In other words, deceleration controller 10 generates the control signal to increase the braking force. At this time, deceleration controller 10 generates the control signal, for example, to increase the braking force at a predetermined variation degree for the vehicular motion to be unstable according to an action of the braking force and to generate relatively quickly the required braking force.

Next, the routine goes to a step S15. deceleration controller 10 sets a value of a subtraction of a preset reduction quantity ΔAdn from a target throttle opening angle Acc* at the present time to a new target throttle opening angle Acc* (=Acc*−ΔAdn). Then, the routine goes to a step S16. At step S16, deceleration controller 10 determines whether target throttle opening angle Acc*<0. If Acc*<0, the routine goes to a step S17 at which target throttle opening angle Acc* is limited to zero and the routine goes to a step S18. If Acc*<0, the routine jumps to step S18.

At step S18, deceleration controller 10 outputs the control signal to brake fluid pressure control unit 1 generated at step S14. The control signal to achieve target throttle opening angle Acc* set at step S15 or step S17 is outputted to engine throttle control unit 3. Then, the timer interrupt processing is ended and the routine is returned to a main program (not shown).

On the other hand, if target deceleration Xg* is at the acceleration side (Xg*≦0) at step S12, the routine goes to a step S21. At step S21, deceleration controller 10 determines whether deceleration control flag F is ON. If deceleration control flag F is ON (Yes), the routine goes to a step S22. At step S22, deceleration controller 10 determines whether a braking force recovery processing at a step S23 as will be described later is ended. If the braking force recovery processing is not ended (No) at step S22, the routine goes to step S23. At step S23, deceleration controller 10 generates the control signal to control the brake fluid pressure in the pressure decrease direction for the increase quantity of the brake fluid pressure according to the braking force increase process not to becomes zero. At this time, the control signal, for example, such that the driving force is decreased at a predetermined variation degree to end relatively quickly the generation of the braking force and the vehicle motion does not become unstable due to no action of the braking force is generated. Then, the routine goes to a step S25.

On the other hand, in a case where the braking force recovery process is ended at step S22 (Yes), namely, in a case where the braking force increase quantity according to the braking force increase processing is zeroed, the routine goes to a step S24. A value of addition of a preset increase quantity ΔAup to target throttle opening angle Acc* at the present time is a new target throttle opening angle Acc* (=Acc*+ΔAup). Then, the routine goes to a step S25.

At step S25, deceleration controller 10 determines whether a recovery of the throttle opening angle is ended. Specifically, deceleration controller 10 determines whether target throttle opening angle Acc* at the present time has reached to base throttle opening angle Accbs at the present time calculated at step S11. If target throttle opening angle Acc* has reached to base throttle opening angle Accbs, a recovery of throttle opening angle is determined to be ended. Then, the routine goes to a step S26. At step S26, deceleration control flag F is set to "OFF". Thereafter, the routine goes to step S18. On the other hand, if target throttle opening angle Acc* is not reached to base throttle opening angle Accbs at step S25 (No), the recovery of throttle opening angle is not yet ended and the routine directly goes to step S18. Then, at step S18, a braking force control signal is outputted to brake fluid pressure control unit 1 and the control signal of the engine throttle opening angle is outputted to engine throttle control unit 3.

On the other hand, if, at step S21, deceleration control flag F is turned to "OFF", deceleration controller 10 determines that target deceleration Xg* is at the acceleration side and determines that it is not necessary to perform the deceleration control. Then, the routine goes to a step S27. At step S27, deceleration controller 10 sets base throttle opening angle Accbs at the present time as target throttle opening angle Acc*. Then, the routine goes to a step S28. At step S28, deceleration controller 10 maintains deceleration control flag F at "OFF". Thereafter, the routine goes to step S18. Then, the control signals are respectively outputted to brake fluid pressure control unit 1 and engine throttle control unit 3.

Next, an operation of the first embodiment will be described in details below. Suppose now that in a state where the vehicle is not turned, target vehicle speed V* calculated on the basis of yaw select value φ* at the present time, lateral acceleration limitation value Yg*, and road surface frictional coefficient estimated value μ is relatively large and target deceleration Xg* is below zero. In this case, in FIG. 5, the routine goes from step S11 to step S21 via step S12. At this time, the deceleration control is not intervened. Deceleration control flag F is "OFF" and the routine goes from step S21 to step S27.

Therefore, base throttle opening angle Accbs in accordance with the manipulated variable of accelerator pedal is set as target throttle opening angle Acc*. To achieve target throttle valve Acc*, engine throttle control unit 3 is controlled. Hence, throttle opening angle is controlled to the throttle opening angle in accordance with the operation of the driver's accelerator pedal operation. In addition, at this time, the braking force control to the braking fluid pressure control unit 1 is not carried out. Hence, the vehicular motion is in accordance with the manipulations of the accelerator pedal or brake pedal of the driver.

Figure 5:
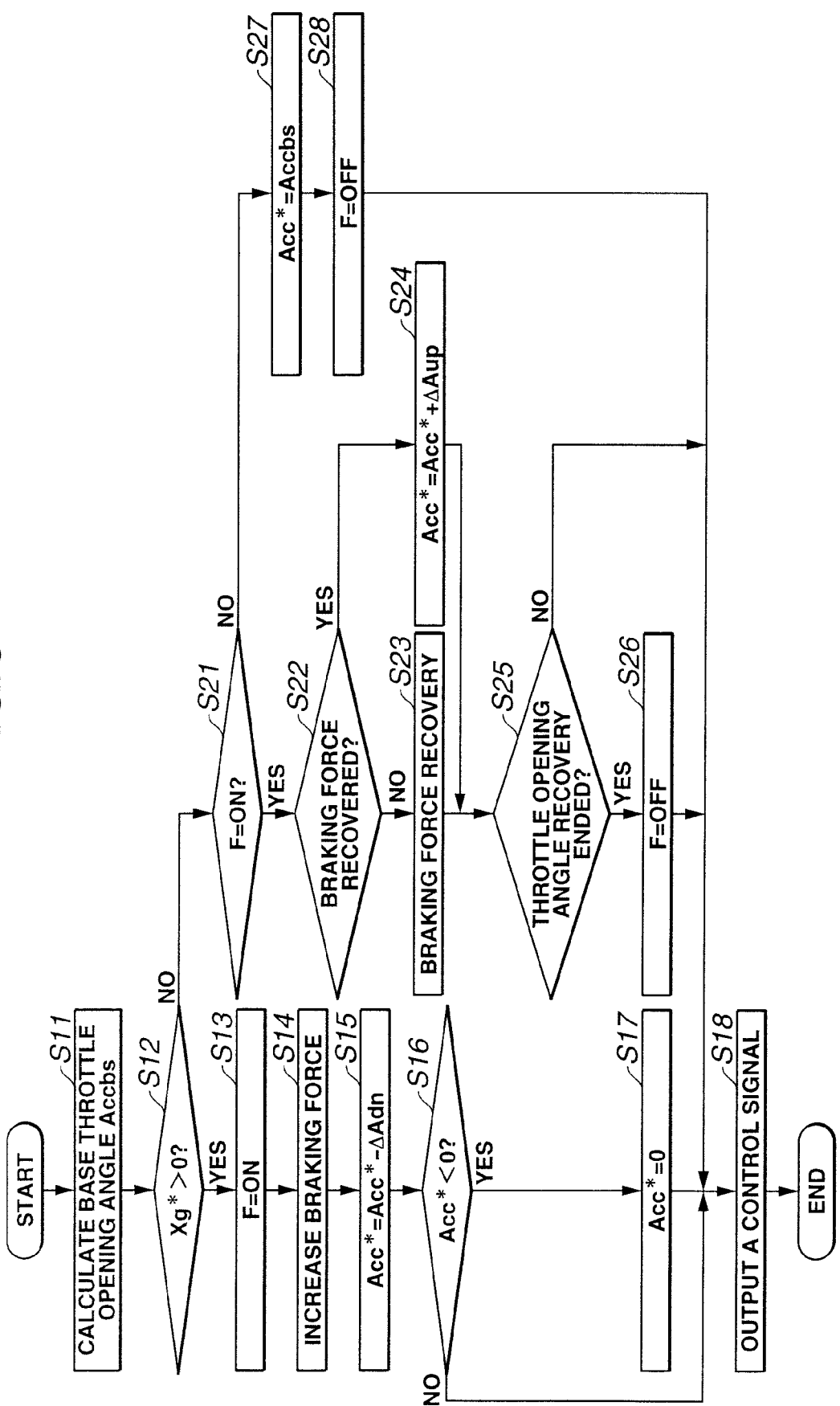
FIG. 5 is a flowchart representing an example of a control signal output procedure executed at a step S5 shown in FIG. 3.

From this state, if the vehicle is turned on a curved road, target vehicle speed V* is decreased and target deceleration Xg* is larger than zero (Xg*>0), the driving force control is carried out to achieve this target deceleration Xg*. That is to say, as shown in FIG. 5, the routine goes from step S11 to step S13 via step S12. After deceleration control flag F is set to "ON", the braking force control is carried out in the direction at which the braking force is increased (step S14). Furthermore, as target throttle opening angle Acc*, a value of the subtraction of the reduction quantity ΔAdn from a previous target throttle opening angle Acc* is set as target throttle opening angle Acc* (step S15).

Then, during a time interval at which target deceleration Xg* is larger than zero, deceleration control flag F is set to "ON". Thus, the routine goes from step S11 to step S15 via steps S12, S13, and S14. The braking force is developed and the deceleration to achieve target deceleration Xg* is carried out. On the other hand, the throttle opening angle is controlled in such a manner that throttle opening angle is gradually decreased by a reduction quantity ΔAdn from base throttle opening angle Accbs immediately before target deceleration Xg* is Xg*>0 and finally in a completely closed state.

In details, as shown in FIGS. 6A through 6C, at a time point t1 at which target deceleration Xg* is Xg*>0 (refer to FIG. 6A), the braking force is developed to decelerate the vehicle to achieve target deceleration Xg*. At this time, target throttle opening angle Acc* (refer to FIG. 6B) is controlled to be gradually in a complete close state. Accordingly, throttle opening angle is controlled to the complete closure state at a specified gradient by reduction quantity ΔAdn.

As described above, when the vehicle is turned at the vehicle speed exceeding target vehicle speed V* which is predicted that the vehicle can travel at a stable vehicular motion, the deceleration control generates forcefully the braking force at a time point at which the vehicle speed is in excess of target vehicle speed V*. Hence, a speedy deceleration control can be started and the deceleration effect can be obtained at the earlier stage. In addition, at this time, the throttle opening angle is gradually throttled to the complete closure state at a time point at which the vehicle speed is in excess of target vehicle speed V*. Therefore, giving the driver unpleasant feeling can be avoided due to the abrupt complete closure state of throttle opening angle. Then, the deceleration effect can be achieved while avoiding the interference between the driving force and the braking force developed due to the deceleration control.

Then, from this state, when target deceleration Xg* is equal to or below zero due to the end of passing the vehicle through the curved road and due to the execution of the deceleration control, the routine shown in FIG. 5 goes from step S12 of FIG. 5 to step S21. In this case, since the deceleration control is already executed and deceleration control flag F is turned to "ON". The routine goes from step S21 to step S23 via step S22 and recovery processing of the braking force is carried out. AT this time, the control to reduce the braking force is carried out. During the time at which the braking force recovery processing is not ended, the routine goes from step S22 to step S25 via step S23. Since the update of target throttle opening angle Acc* is not carried out. As shown in FIGS. 6A through 6C, at a time point t2 at which target deceleration Xg* is equal to or below zero, target throttle opening angle Acc* maintains zero and the throttle opening angle maintains the complete closure state.

Then, when the increase quantity of the braking force due to the deceleration control is recovered to zero and the generation of the braking force is ended, the routine goes from step S22 to step S24. The value of addition of increase quantity ΔAup to a previous value of target throttle valve Acc* is set. In a case where the recovery of the throttle opening angle is not ended, the routine goes from step S23 to step S25 via steps S24 and S25. This processing is repeated. Hence, target throttle opening angle Acc* is gradually increased by increase quantity ΔAup.

Therefore, as shown in FIGS. 6A through 6C, at a time point t3, the increase quantity of the braking force by means of the deceleration control is recovered to zero. From this time point, throttle opening angle is increased gradually at a gradient corresponding to the increase quantity ΔAup. When target throttle opening angle Acc* is reached to base throttle opening angle Accbs at the present time, the recovery of the throttle opening angle is ended. Then, the routine goes from step S25 to step S26 and deceleration control flag F is set to "OFF".

Hence, thereafter, the routine goes from step S11 to step S27 via step S21. Base throttle opening angle Accbs is set as target throttle opening angle Acc*. In addition, since the braking force control is not executed according to the deceleration control, the vehicular motion according to the driver's manipulations on the brake pedal and accelerator pedal can be achieved.

As described above, when the recovery of the driving force control by the intervention of the deceleration control is carried out, throttle opening angle is gradually recovered to base throttle opening angle Accbs. The abrupt increase in throttle opening angle along with the recovery of the driving force which causes the unpleasant feeling to be given to the driver can be avoided. In addition, at this time, after the braking force by means of the deceleration control is recovered to zero, the throttle valve is increased. Hence, a speedy recovery of the driving force can be carried out while avoiding the interference between the braking force due to the deceleration control and the driving force.

It is noted that In FIGS. 6A through 6C, a lateral axis denotes a passage of time, FIG. 6A shows target deceleration Xg*, FIG. 6B shows target throttle opening angle Acc*, and FIG. 6C shows a variation situation of the braking force caused by the deceleration control.

As described above, when the braking force control is carried out by the control intervention from the deceleration control, along with the start of the braking force control, throttle opening angle is gradually controlled to the complete closure state and, along with the recovery of the braking force, throttle opening angle is gradually recovered to base throttle opening angle Accbs. Hence, while avoiding the vehicular motion variation along with the variation in throttle opening angle and giving the driver the unpleasant feeling, the sufficient deceleration effect can be obtained. It is noted that the processes of steps S14 and S23 correspond to deceleration control section and the processes of steps S17 to S17 and steps S24 and S25 correspond to throttle opening angle controlling section.

Next, a second embodiment of the deceleration control apparatus will be described below. In the second embodiment, reduction quantity ΔAdn when the throttle opening angle is controlled to be in the complete closure state is set in accordance with road surface frictional coefficient μ. The other structures are generally the same as those in the first embodiment. The detailed description thereof will be omitted herein. In this second embodiment, deceleration controller 10 executes the processing shown in FIG. 7 for the process at step S5 in FIG. 3. That is to say, although the same processes as those described in the first embodiment are executed in the second embodiment, after step S14 at which the braking force increase processing is carried out, the routine goes to a step S14a. At step S14a, reduction quantity ΔAdn is set in accordance with road surface frictional coefficient μ. Then, the routine goes to step S15. At step S15, deceleration controller 10 sets target throttle opening angle Acc* in accordance with reduction quantity ΔAdn set at step S14a.

Figure 8:
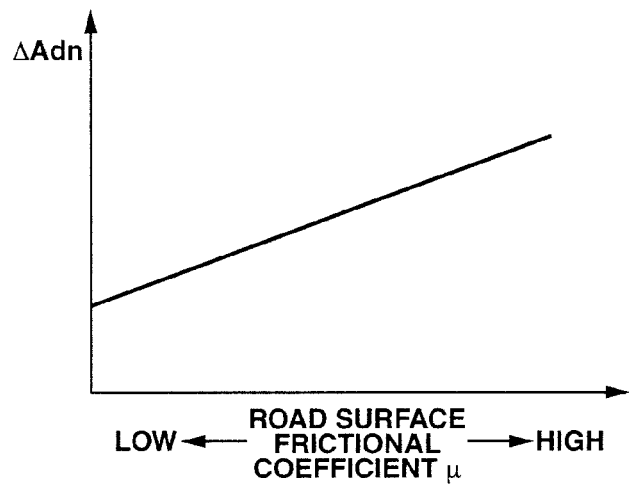
FIG. 8 is an example of a control map used in a calculation processing shown in FIG. 7.

Specifically, at step S14a, reduction quantity ΔAdn is set in accordance with road surface frictional coefficient μ at a time point at which target deceleration Xg* is Xg*>0. This reduction quantity ΔAdn is set in proportion to the magnitude of road surface frictional coefficient μ, as shown in FIG. 8. As road frictional coefficient μ becomes larger, reduction quantity ΔAdn becomes larger. In other words, in a case where the vehicle is traveling on a dry road, namely, road surface frictional coefficient μ becomes large, it can be predicted that even if throttle opening angle is relatively largely reduced, the vehicular motion would not be disturbed along with the variation in throttle opening angle. Hence, reduction quantity ΔAdn of target throttle opening angle Acc* is set to a relatively large value and throttle opening angle can speedily be controlled to the complete closure state. The vehicular motion variation can be suppressed. The unpleasant feeling that the driver gives can be suppressed and throttle opening angle is speedily controlled into the complete closure state so that the deceleration effect can be improved.

On the contrary, in a case where the vehicle is traveling on a wet road surface, namely, the road surface frictional coefficient μ is small, if throttle opening angle is largely decreased, it is predicted that there is a possibility that the vehicular motion is disturbed depending upon a case along with the variation in the throttle opening angle. Hence, reduction quantity ΔAdn of target throttle opening angle Acc* is set to a relatively small value. The reduction quantity of throttle opening angle is small so that throttle opening angle is moderately controlled to be in the complete closure state. Thus, while suppressing the vehicular motion variation on the low frictional coefficient road surface, the deceleration effect can be exhibited.

Figure 9:
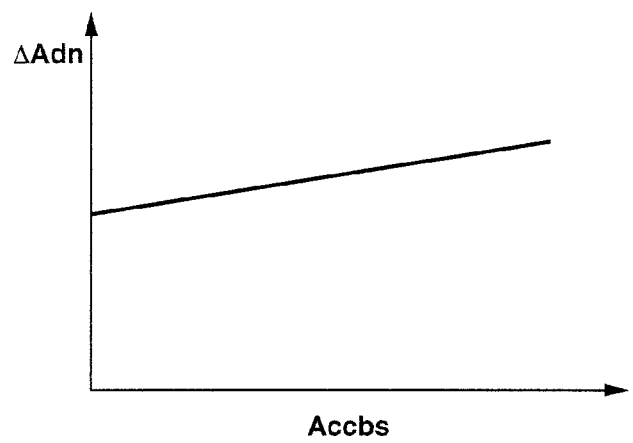
FIG. 9 is an example of a control map used in another example of the second embodiment of the deceleration control apparatus.

It is noted that, in the second embodiment, reduction quantity ΔAdn is set in accordance with road frictional coefficient μ. However, the present invention is not limited to this. For example, as shown in FIG. 9, reduction quantity ΔAdn may be set in accordance with base throttle opening angle Accbs at a time point at which target deceleration Xg* is Xg*>0. For example, as base throttle opening angle Accbs becomes larger, reduction quantity ΔAdn may be increased in proportion to this base throttle opening angle Accbs.

In details, when base throttle opening angle Accbs is large, throttle opening angle at the present time becomes large. That is to say, it takes a lot of time to control throttle opening angle to the complete closure state. Hence, when base throttle opening angle Accbs is large, reduction quantity ΔAdn is set to a relatively large value. The reduction quantity of throttle opening angle is made large so that a required time for throttle opening angle to be controlled in the complete closure state can be shortened, namely, the speedily the deceleration effect can be exhibited. On the contrary, when base throttle opening angle Accbs is small, the required time for the throttle opening angle to be controlled to the complete closure state is relatively short. Hence, reduction quantity ΔAdn is set to a relatively small value. Thus, the vehicular motion variation along with the variation in the throttle opening angle and the fact that the unpleasant feeling is given to the driver can sufficiently be avoided.

Figure 10:
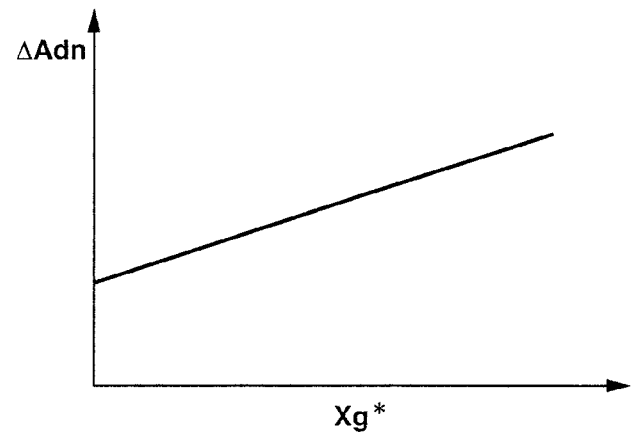
FIG. 10 is an example of a control map used in another example of the second embodiment of the deceleration control apparatus.

In addition, for example, reduction quantity ΔAdn may sequentially be updated and set in accordance with sequentially calculated target deceleration Xg*. In details, at step S14a in FIG. 7, reduction quantity ΔAdn is set which accords with target deceleration Xg* calculated at the process of step S4 in FIG. 3. For example, as shown in FIG. 10, reduction quantity ΔAdn may be set to become larger as target deceleration Xg* becomes larger.

Since large target deceleration Xg* requires accordingly the deceleration, when target deceleration Xg* becomes large, reduction quantity ΔAdn is set to a relatively large value. The throttle opening angle is relatively quickly controlled to be in the complete closure state so that the speedy deceleration effect can be exhibited in accordance with the deceleration degree required. On the contrary, in a case where target deceleration Xg* is small, the deceleration is not so required. Hence, reduction quantity ΔAdn is set to be a relatively small value. Thus, along with the variation in throttle opening angle, the vehicular motion variation and the unpleasant feeling that the driver gives can be reduced. In addition, along with the variation in target deceleration Xg*, reduction quantity ΔAdn is updated so that the throttle opening angle can be controlled in response to the variation in the required degree of the deceleration.

Furthermore, as described above, reduction quantity ΔAdn is not limited to be set on the basis of any one of road surface frictional coefficient μ, base throttle opening angle Accbs, and target deceleration Xg*. However, the present invention is not limited to this. Reduction quantity ΔAdn may be set with a plurality of conditions from these conditions taken into consideration. Reduction quantity ΔAdn is set on the basis of the plurality of conditions so that reduction quantity ΔAdn may be set in accordance with the vehicular traveling state or vehicular traveling environment. That is to say, an accurate deceleration effect can be obtained in accordance with the travel state or travel environment.

Next, a third preferred embodiment of the deceleration control apparatus will be described below. In the third embodiment, as compared with the second embodiment, the method of setting reduction quantity ΔAdn is different. The other structures are generally the same as each of the first and second embodiments. The detailed description thereof will be omitted. In the third embodiment, at the process of step S14a in FIG. 7, different reduction quantities ΔAdn are set at a time point at which the deceleration control is started and at a time point other than the above-described time point. Specifically, at a time point at which the deceleration control is started, namely, at a first time point at which deceleration control flag F is turned from "OFF" to "ON", a relatively large initial reduction value ΔAdn0 (first variation degree) is set as reduction quantity ΔAdn. Then, from the subsequent calculation period, a constant value ΔAconst (second variation degree) is set which is smaller than initial reduction value ΔAdn0 as reduction quantity ΔAdn.

Figure 11:
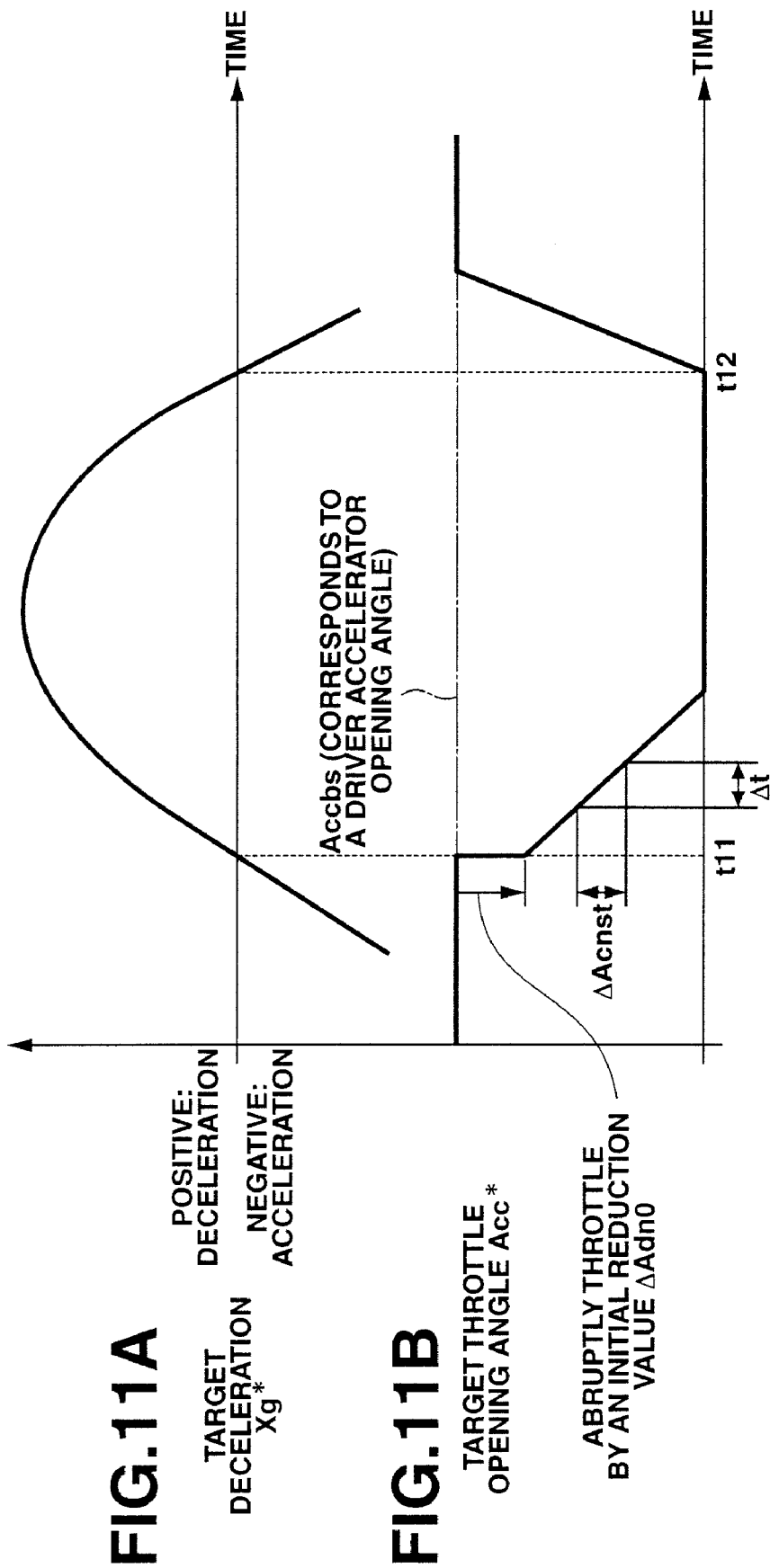
FIGS. 11A and 11B are integrally a timing chart for explaining an operation of the deceleration control apparatus in a third preferred embodiment according to the present invention.

Hence, in a case of the third embodiment, when target deceleration Xg* is Xg*>0, at this time point, initial reduction value ΔAdn0 is set as reduction quantity ΔAdn. Hence, throttle opening angle is largely throttled by initial reduction value ΔAdn0 since, as shown in FIGS. 11A and 11B, at a time point t11, target throttle opening angle Acc* is reduced from the previous target throttle opening angle Acc*. Thereafter, constant value ΔAconst is set as reduction quantity ΔAdn. As appreciated from FIGS. 11A and 11B, the throttle opening angle is decreased at a predetermined gradient specified by ΔAconst.

It is noted that if the throttle opening angle is controlled to be in the complete closure state at time point t11, an acceleration feeling is not abruptly given. Hence, the driver gives the unpleasant feeling. However, by throttling the throttle opening angle by a relatively large initial reduction value ΔAdn0, the unpleasant feeling is more or less given to the driver. This more or less unpleasant feeling can inform the driver of an over (excessive) speed.

Figure 12:
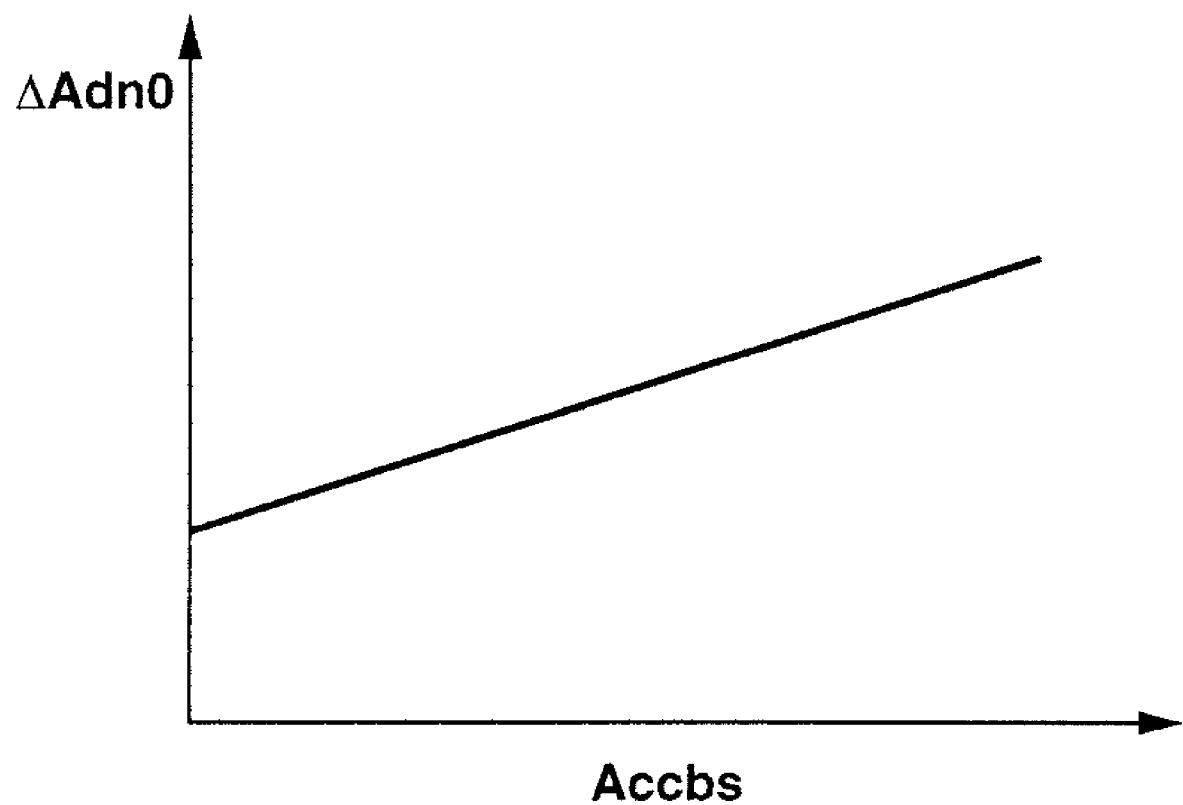
FIG. 12 is an example of a control map used in another example of the third embodiment of the deceleration control apparatus.

In FIGS. 11A and 11B, a lateral axis thereof denotes a passage time and FIG. 11A shows target deceleration Xg* and FIG. 11B shows target throttle opening angle Acc*. Initial reduction value ΔAdn0 may be set to a detected value to such a degree that the drive does not excessively give the unpleasant feeling. In addition, for example, as shown in FIG. 12, initial reduction value ΔAdn0 may be set in accordance with base throttle opening angle Accbs as shown in FIG. 12. That is to say, as base throttle opening angle Accbs becomes large, initial reduction value ΔAdn0 may be set to be larger. In this way, if initial reduction value ΔAdn0 is varied in accordance with a magnitude of base throttle opening angle Accbs, depending on the magnitude of base throttle opening angle Accbs, initial reduction value ΔAdn0 is varied so that the degree of base throttle opening angle Accbs, namely, the degree of the acceleration at the present time can be informed to the driver. Thus, the driver can more effectively be recognized that the present degree of acceleration is excessive.

In the third embodiment, the case where target throttle opening angle Acc* is largely reduced only initial once by initial reduction value ΔAdn0 when target deceleration Xg* is Xg*>0 has been explained. However, the present invention is not limited to this. After target deceleration Xg* is Xg*>0, target throttle opening angle Acc* may relatively largely be reduced over a relatively short interval of time and, thereafter, target throttle opening angle Acc* may moderately be reduced. In summary, when target throttle opening angle Acc* is controlled in the closed state, target throttle opening angle Acc* is relatively largely reduced at the initial stage of the control so that the driver can recognize that the vehicle speed is excessively fast. Hence, in an arbitrary procedure, target throttle opening angle Acc* may be reduced. In addition, constant value ΔAcnst may arbitrarily be preset. Or alternatively, for example, in the same way as described in the second embodiment, constant value ΔAcnst may be set on the basis of any one of road surface frictional coefficient μ, base throttle opening angle Accbs, and target deceleration Xg*. Reduction quantity ΔAdn may be set with the plurality of these conditions taken into consideration. It is of course that constant value ΔAcnst may be set with the plurality of these conditions taken into consideration.

Figure 13:
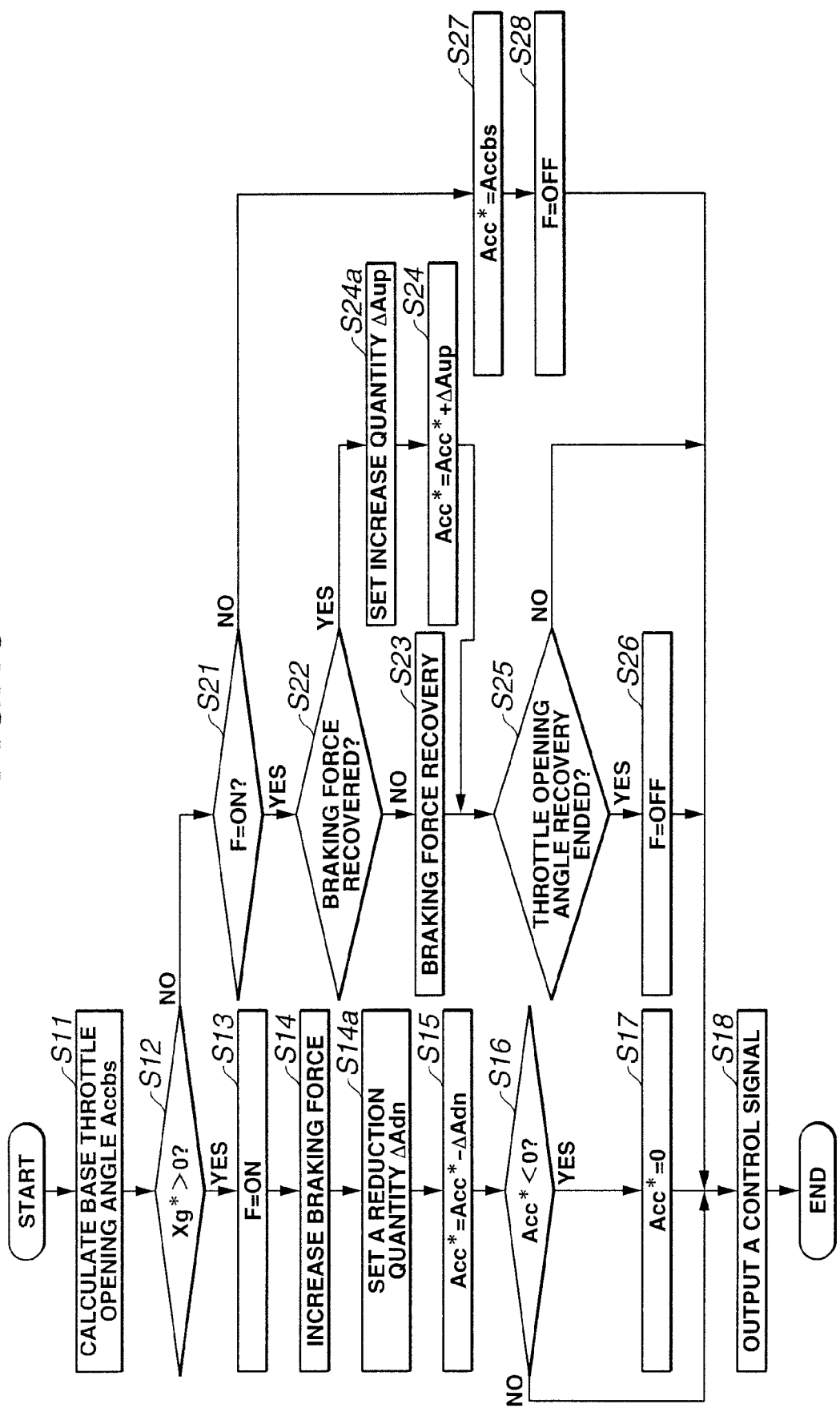
FIG. 13 is a flowchart representing an example of the control signal output procedure in a fourth preferred embodiment of the deceleration control apparatus.

Next, a fourth preferred embodiment of the deceleration control apparatus will be described below. In the fourth embodiment, increase quantity ΔAup when throttle opening is recovered from the complete closure state to base throttle opening angle Accbs is set in accordance with road surface frictional coefficient μ. The other structures are generally the same as described in the first embodiment. Therefore, the detailed description thereof will herein be omitted. In the fourth embodiment, deceleration controller 10 executes the calculation processing shown in FIG. 13. That is to say, the similar processing is carried out in the same way as described in the second embodiment. However, if the recovery of the braking force is not yet ended (Yes) at step S22, the routine goes to a step S24a. At step S24a, deceleration controller 10 sets increase quantity ΔAup in accordance with road surface frictional coefficient μ (recovery degree setting means (section)). Then, the routine goes to a step S24. At the process of step S24, target throttle opening angle Acc* is set in accordance with increase quantity ΔAup set at step S24a.

Figure 14:
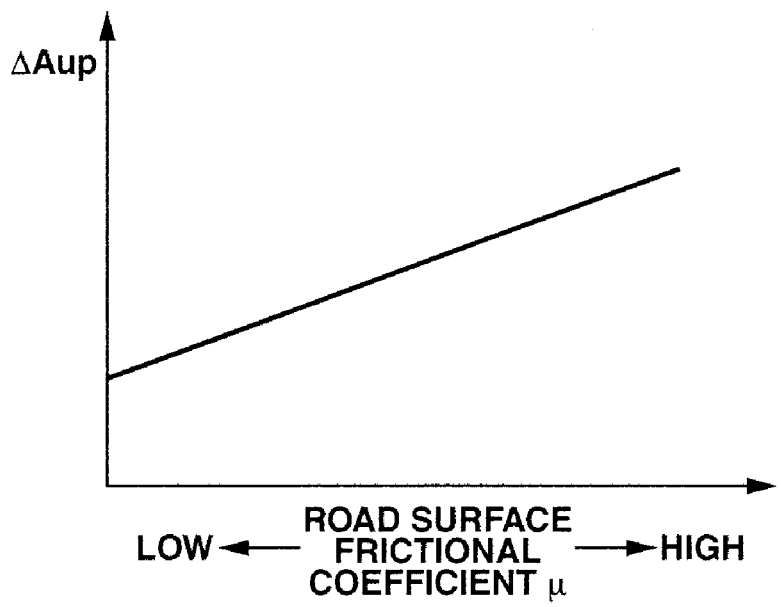
FIG. 14 is an example of a control map used in the calculation processing shown in FIG. 13.

Specifically, at the process of step S24a, increase quantity ΔAup is set in accordance with road surface frictional coefficient μ when target deceleration is Vg*>0. Road surface frictional coefficient μ may be road surface frictional coefficient previously held at a value when target deceleration Xg* is Xg* detected by a process at a step S14a. Increase quantity ΔAdn is set to become larger in proportion to road surface frictional coefficient μ, as shown in FIG. 14.

That is to say, it can be predicted that, when road surface frictional coefficient μ is large in a case where the vehicle is traveling on a dry road, even if the throttle opening angle is relatively largely increased, the vehicular motion is not disturbed along with the variation in throttle opening angle. Hence, if throttle opening angle is relatively largely increased, throttle opening angle can speedily be recovered to base throttle opening angle Accbs. While suppressing the unpleasant feeling given to the driver with the variation in the vehicular motion, the sufficient acceleration effect can be obtained.

On the contrary, it will be predicted that, when road surface frictional surface μ is small in such a case where the vehicle is traveling on a wet road and throttle opening angle is largely increased, the vehicular motion may often be disturbed along with the variation in the throttle valve opening angle. Therefore, when increase quantity ΔAup of throttle opening angle is set to a relatively small value so that throttle opening angle is moderately recovered to base throttle angle Accbs. Thus, while the vehicular motion variation is suppressed on the low frictional coefficient road, the vehicular travel mode can smoothly be transferred to an acceleration travel.

It is noted that, in the fourth embodiment, increase quantity ΔAup is set on the basis of road surface frictional coefficient μ. However, the present invention is not limited to this. For example, a variation quantity ΔV* of target vehicle speed V* calculated at step S3 is sequentially calculated. Increase quantity ΔAup may be set in accordance with the variation in variation quantity V*. In details, variation quantity ΔV* of target vehicle speed V* calculated at step S3 is sequentially calculated. In accordance with the variation in variation quantity ΔV*, the increase quantity ΔAup is sequentially updated.

Figure 15:
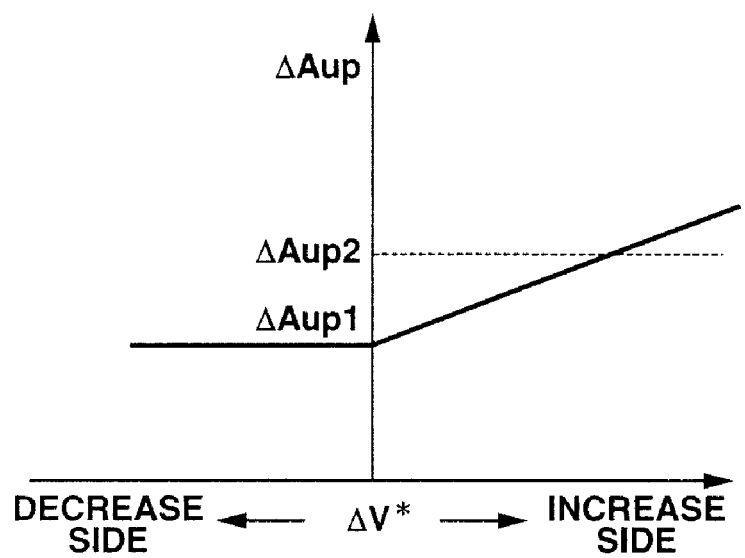
FIG. 15 is an example of a control map used in another example of the fourth preferred embodiment.

Increase quantity ΔAup is for example, as shown in FIG. 15, when target vehicle speed V* tends to be in the increase direction, as its variation quantity ΔV* becomes large, increase quantity ΔAup is increased from a reference value ΔAup1. On the other hand, as target vehicle speed V* is in the decrease direction, increase quantity ΔAup is increased from a reference value ΔAup1. On the other hand, as target vehicle speed V* is in the decrease direction, increase quantity ΔAup is maintained at reference value ΔAup1.

In this way, when target vehicle speed V* is varied in the increase direction, the vehicle motion is varied in the direction in which the yaw rate becomes small, i.e., in which the steering angle is returned to be small. Hence, increase quantity ΔAup is made large and a recovery speed of throttle opening angle is made fast. Thus, when the driver tries to make the vehicle accelerate, giving a feeling of a stall can be avoided. In addition, if increase quantity ΔAup is sequentially updated in accordance with a variation situation of target vehicle speed V*, the acceleration feeling can be given in accordance with the variation of an acceleration request (demand) degree of the driver.

It is noted that, as shown in FIG. 15, when target vehicle speed V* is in the increase direction, increase quantity ΔAup is varied in accordance with variation quantity ΔV*. However, as denoted by a dot line shown in FIG. 15, increase quantity ΔAup may be set to a second reference value ΔAup2 which is larger than reference value ΔAup1 irrespective of the magnitude of variation quantity ΔV*. It is also noted that the fourth embodiment is applied to the second embodiment and both of reduction quantity ΔAdn and increase quantity ΔAup are set in accordance with road surface frictional coefficient μ. However, as described in the second embodiment, reduction quantity ΔAdn may be set in accordance with base throttle opening angle Accbs and target deceleration Xg*. In addition, both of the first and third embodiment may be combined together.

Figure 16:
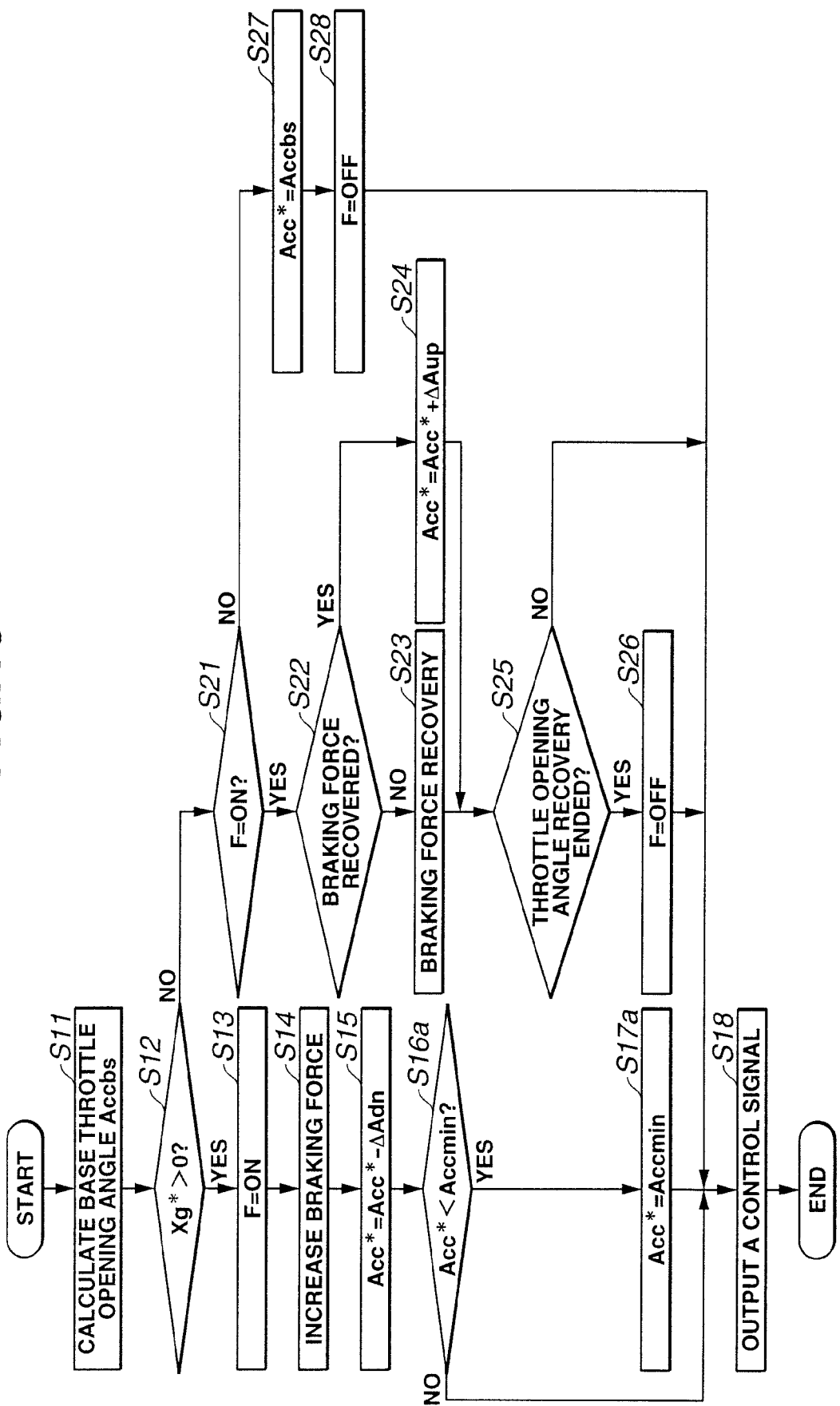
FIG. 16 is a flowchart representing an example of the control signal output procedure in a fifth preferred embodiment of the deceleration control apparatus.

Next, a fifth preferred embodiment of the deceleration control apparatus will be described below. In the fifth embodiment, the calculation processing executed at step S3 in FIG. 3 is different from that described in the first embodiment. The other structures are generally the same as those described in the first embodiment and, hence, the detailed description thereof will herein be omitted. In the fifth embodiment, as shown by a flowchart shown in FIG. 16, in place of the processes at steps S16 and S17 shown in FIG. 5, processes at step S16a and step S17a are executed.

In details, in the fifth preferred embodiment, in the same way as described in the first embodiment, when target deceleration Xg* is Xg*>0, the braking force increase processing is executed to develop the braking force (step S14) and the throttle opening angle is gradually decreased by reduction quantity ΔAdn (step S15). At this time, throttle opening angle is not controlled to the complete closure state but is limited to a preset minimum value Accmin.

Figure 17:
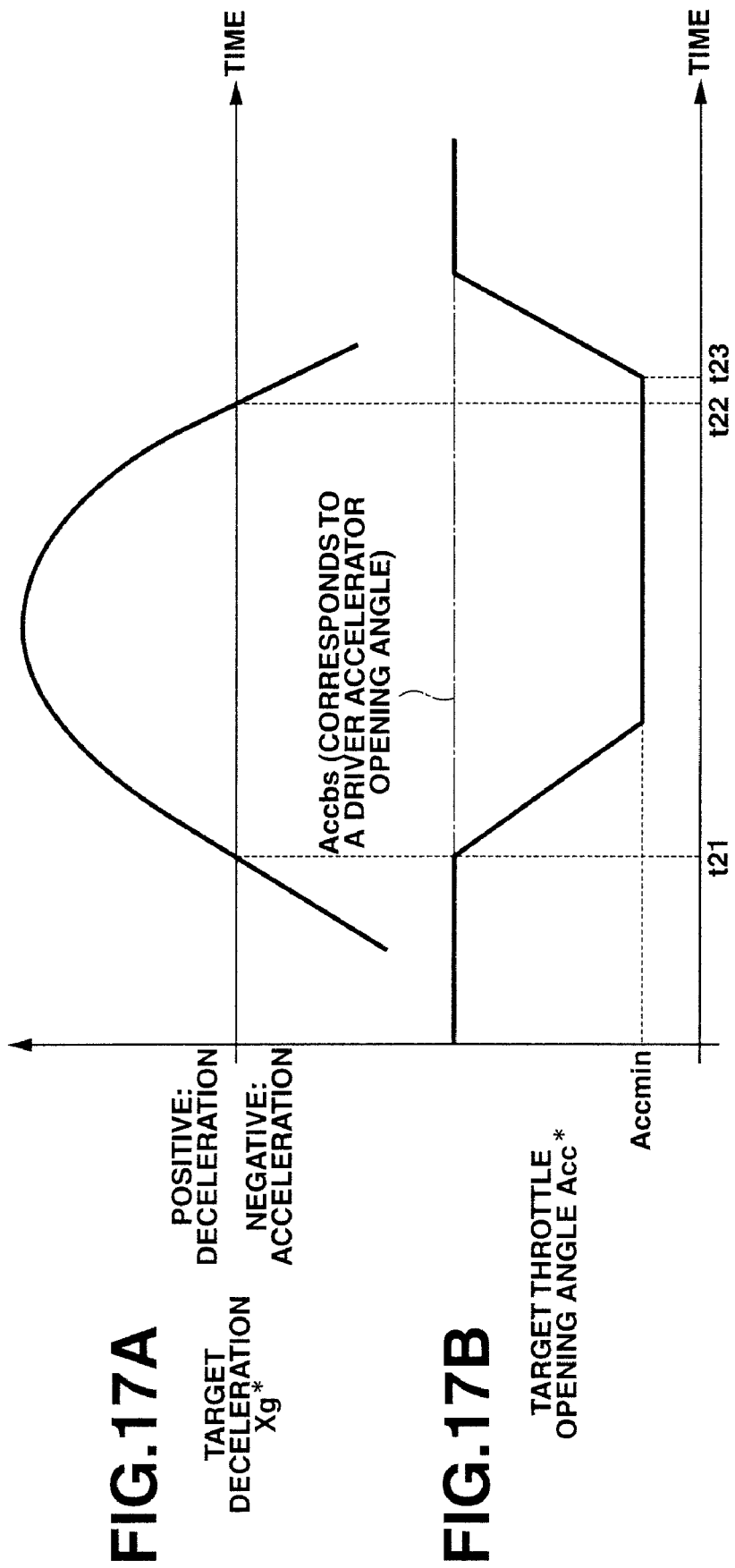
FIGS. 17A and 17B are integrally a timing chart for explaining an operation of the deceleration control apparatus in a fifth preferred embodiment.

Hence, as shown in FIGS. 17A and 17B, when target deceleration Xg* is Xg*>0 at a time point t21, the development of the braking force is started and throttle opening angle is decreased at a gradient specified by reduction quantity ΔAdn and reached to a minimum value Accmin. At this time, throttle opening angle is maintained at this minimum value Acccmin. Then, when, at a time point t22, target deceleration Xg* is equal to or below zero, from this time point, the braking force recovery processing with the increase quantity of the braking force zeroed is started. When, at a time point t23, the increase quantity of the braking force is zeroed, from this time point, target throttle opening angle Acc* is increased by preset increase quantity ΔAup.

Hence, in this case, the same action and advantages as the first embodiment can be achieved. In addition, in the fifth embodiment, throttle valve is not controlled to be in the complete closure state and the driving force to some degree is secured even when the braking force is developed according to the deceleration control. Hence, while avoiding the feeling of the stall from being given to the driver, the deceleration effect can be obtained in response to the accelerator manipulation by the driver.

In addition, in this case, when throttle opening angle is recovered to base throttle opening angle Accbs, minimum value Accmin may be recovered to base throttle opening angle Accbs. Hence, as compared with a case where the complete closure state is recovered to base throttle opening angle Accbs, a required time for the recovery can be shortened. A more speedy recovery at the time of the end of the braking control by means of the deceleration control can be achieved. It is noted that, in FIGS. 17A and 17B, each lateral axis denotes a passage time and FIG. 17A shows target deceleration Xg* and FIG. 17B shows target throttle opening angle Acc*.

Figure 18:
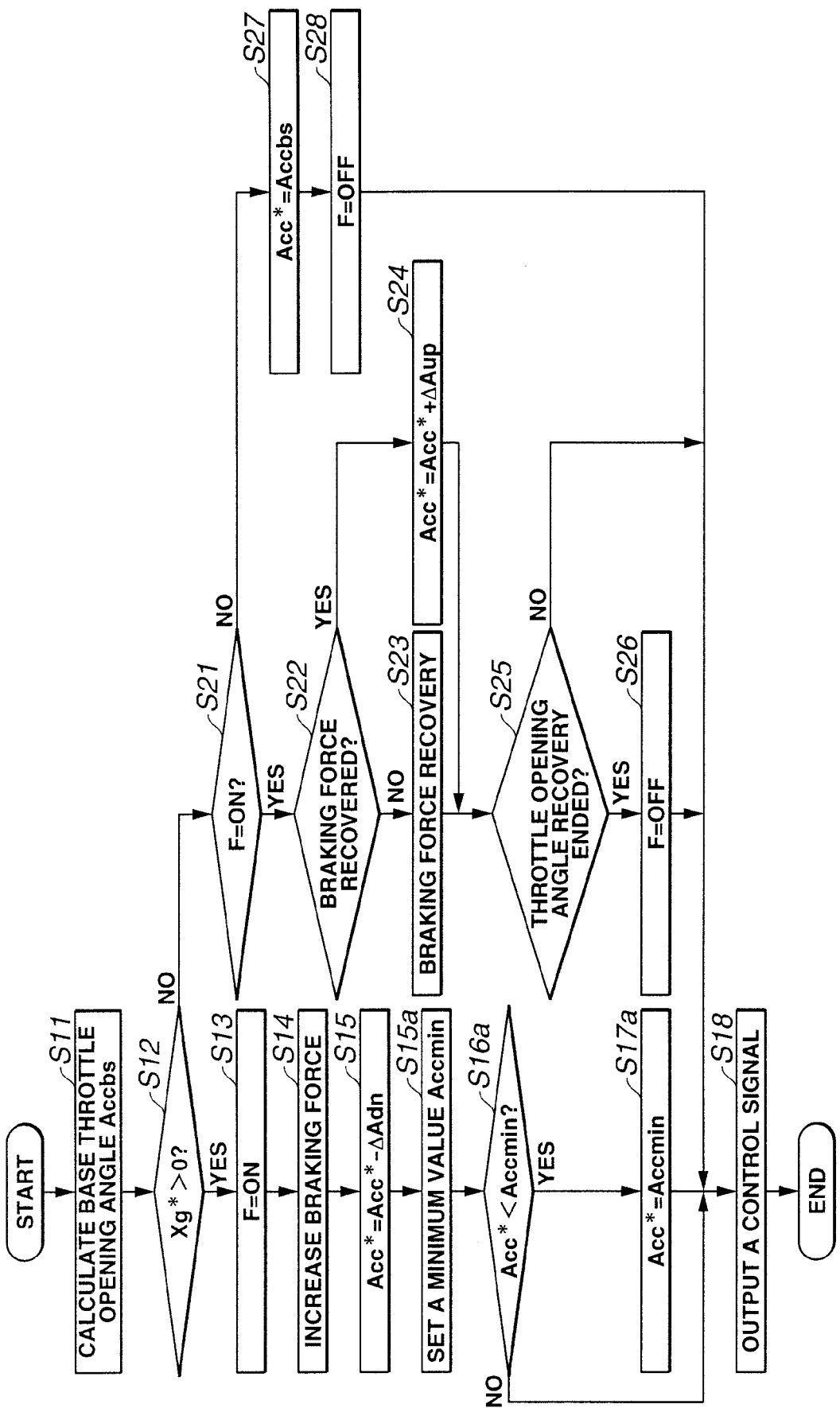
FIG. 18 is a flowchart representing an example of the control signal output procedure in a sixth preferred embodiment of the deceleration control apparatus.

Next, a sixth preferred embodiment of the deceleration control apparatus will be described bellow. In the sixth embodiment, the minimum value Accmin described in the fifth embodiment is set in accordance with base throttle opening angle according to the accelerator pedal manipulation of the driver (hereinafter, called Accbs (driver)). The other structures are generally the same as described in the first embodiment. Thus, the detailed description thereof will herein be omitted. In the sixth embodiment, as shown in a flowchart of FIG. 18, in the same way as described in the fifth embodiment, after target throttle opening angle Acc* at the process of step S15 is calculated, the routine goes to a step S15a at which deceleration controller 10 sets minimum value Accmin and, thereafter, the routine goes to a step S16a at which minimum value Accmin set at step S15a and target throttle opening angle Acc* are compared with each other.

At step S15a, minimum value Accmin is updated in accordance with sequentially calculated base throttle opening angle Accbs at step S11 (minimum opening angle setting section(means)). This minimum value Accmin is increased in proportion to the increase in base throttle opening angle Accbs (driver) when base throttle opening angle (driver) is equal to or below a threshold value Accbs1 and is set to a prescribed value Accmin1 (for example, about 15%) when base throttle opening angle Accbs (driver) is larger than threshold value Accbs1.

When base throttle opening angle Accbs (driver) is relatively large, minimum value Accmin is set to a certain value so that the acceleration feeling in response to the driver's accelerator pedal depression is assured while the interference between the braking force due to the deceleration control and the driving force is avoided. On the contrary, when base throttle opening angle Accbs (driver) is relatively small and the driver does not expect the acceleration feeling, minimum value Accmin is varied in proportion to base throttle opening angle (driver) so that the driving force in accordance with the acceleration feeling that the driver expects can be developed and the interference between the braking force caused by the deceleration force and the driving force can be avoided.

Figure 19:
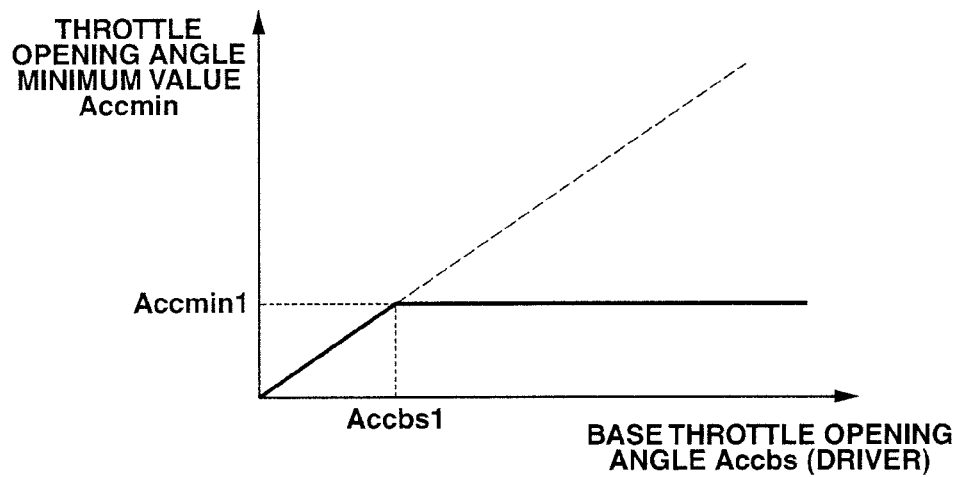
FIG. 19 is an example of a control map used in a calculation processing shown in FIG. 18.
Figure 20:
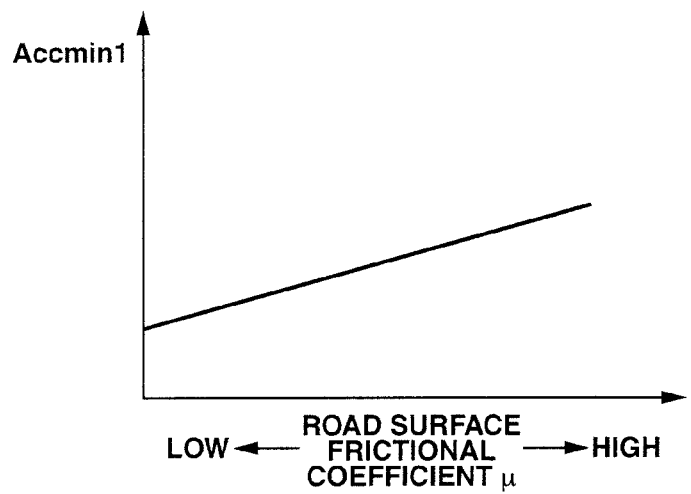
FIG. 20 is an example of a control map used in another example of the sixth embodiment of the deceleration control apparatus.
Figure 21:
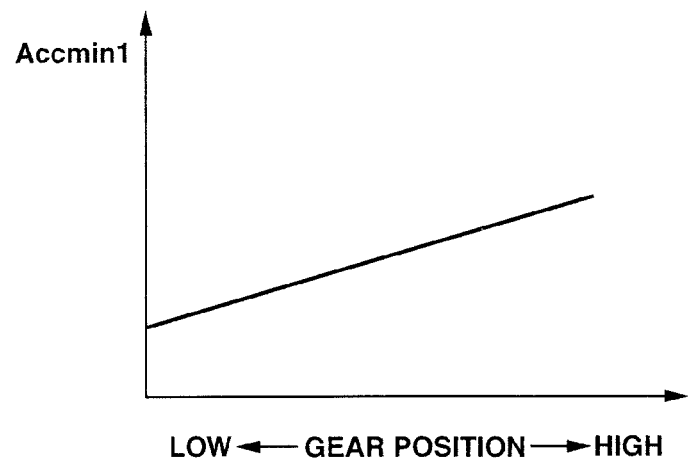
FIG. 21 is an example of a control map used in another example of the sixth embodiment of the deceleration control apparatus.

In the sixth embodiment, prescribed value Accmin1 is fixed. However, the present invention is not limited to this. For example, prescribed value Accmin1 may be varied on the basis of road surface frictional coefficient μ. In details, at the process of step S15a in FIG. 18, prescribed value Accmin1 is set on the basis of road surface frictional coefficient μ at a time point at which target deceleration Xg* is Xg*>0. This prescribed value Accmin1 is set to become larger in proportion to the increase in road surface frictional coefficient μ, as shown in FIG. 20. Then, in accordance with a correlation between minimum value Accmin denoted by a dot line in FIG. 19 and base throttle opening angle Accbs (driver), threshold value Accbs1 of base throttle opening angle Accbs (driver) corresponding to prescribed value Accmin1 is set. If base throttle opening angle Accbs (driver) is larger than threshold value Accbs1, prescribed value Accmin1 in accordance with road surface frictional coefficient μ is set as minimum value Accmin. If base throttle opening angle Accbs (driver) is equal to or lower than threshold value Accbs1, minimum value Accmin corresponding to base throttle opening angle Accbs (driver) in accordance with a correlation between minimum value Accmin denoted by the dot line in FIG. 19 and base throttle opening angle Accbs (driver).

In other words, in a case where the vehicle is traveling on a road surface having a high road surface frictional coefficient μ such as a wet road, the vehicle can be deemed to stably be traveled. Hence, prescribed value Accmin1 is set to a relatively large value and minimum value Accmin is secured to a relatively large value so that the driver's intention is reflected. Thus, the feeling of the stall can be avoided from giving the driver. On the contrary, in a case where road surface frictional coefficient μ is low (small) such as a case where the vehicle is traveling on a wet road surface, prescribed value Accmin1 is set to a relatively small value. By making minimum value Accmin a relatively small value, the stable travel can be made while assuring the driving force to some degree.

In addition, in a case where the vehicle is a vehicle in which, for example, a transmission is equipped, prescribed value Accmin1 may be set on the basis of a shift ratio of the transmission. For example, as a gear position which sets the shift ratio becomes higher, prescribed value Accmin1 may be set to become larger in proportion to the gear position. As the gear position becomes higher, a torque of a drive axle becomes difficult to be transmitted. Hence, by setting prescribed value Accmin1 to be larger, the response to the accelerator pedal by the driver can be quickened. Thus, the feeling of the stall can be avoided from giving the driver.

Figure 22A:
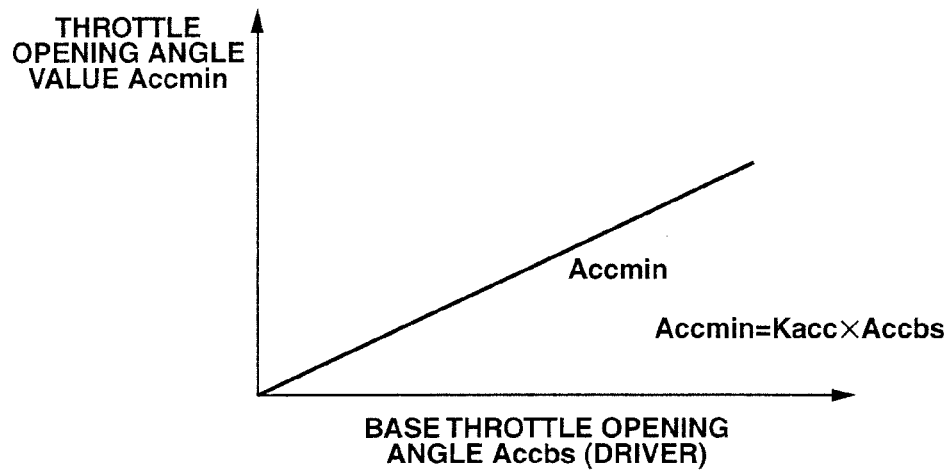
FIGS. 22A, 22B, and 22C are examples of control maps used in another example of the sixth embodiment.

In addition, for example, as shown in FIG. 22A, minimum value Accmin may be set in accordance with a first order (linear) function specified by a gain Kacc in accordance with base throttle opening angle Accbs (driver) according to the accelerator pedal manipulation by the driver. In details, minimum value Accmin is sequentially updated in accordance with sequentially calculated base throttle opening angle Accbs (driver). At this time, minimum value Accmin is set to be a larger value in proportion to base throttle opening angle Accbs (driver) when base throttle opening angle Accbs (driver) is large. Thus, the acceleration feeling can be secured in accordance with the degree of acceleration that the driver expects. In addition, at this time, minimum value Accmin is sequentially calculated and updated in accordance with base throttle opening angle Accbs (driver). Thus, the acceleration feeling can be varied in accordance with the acceleration degree that the driver expects.

Figure 22B:
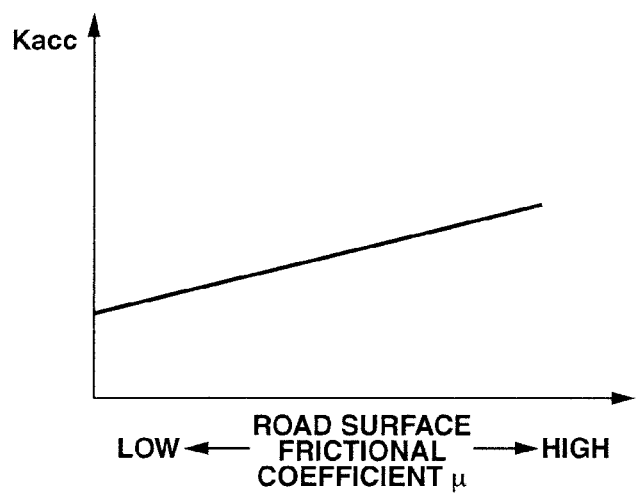

In addition, at this time, gain Kacc may be varied in accordance with road surface frictional coefficient μ at a time point at which target deceleration Xg* is Xg*>0, as shown in FIG. 22B. As shown in FIG. 22B, as road surface frictional coefficient μ becomes higher, gain Kacc is set to be a larger value so that minimum value Accmin is set to a large value. When it is predicted that, even if road surface frictional coefficient μ is high and the relatively large driving force is developed, the vehicular motion is not disturbed, minimum value Accmin is secured to a certain value and the acceleration feeling that the driver expects can be given.

Figure 22C:
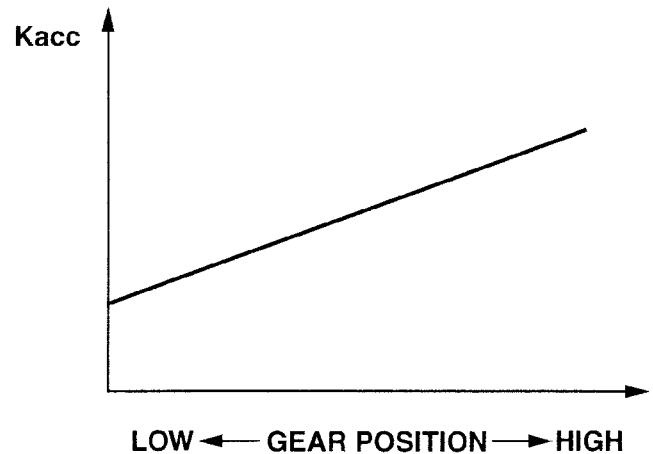

In addition, in a case where the vehicle is equipped with the transmission, gain Kacc may be varied in accordance with the shift (gear) ratio. In details, when the gear position specifying the gear (shift) ratio is detected, as shown in FIG. 22C, gain Kacc may be varied in accordance with the gear position at a time point at which target deceleration Xg* is Xg*>0. As shown in FIG. 22C, as the gear position becomes higher, namely, the torque of the drive axle becomes difficult to be transmitted, gain Kacc may be set to a larger value and minimum value Accmin is set to be a larger value. The response to the accelerator pedal manipulation of the driver may be quickened. The feeling of the stall can be avoided from giving the driver.

Figure 23A:
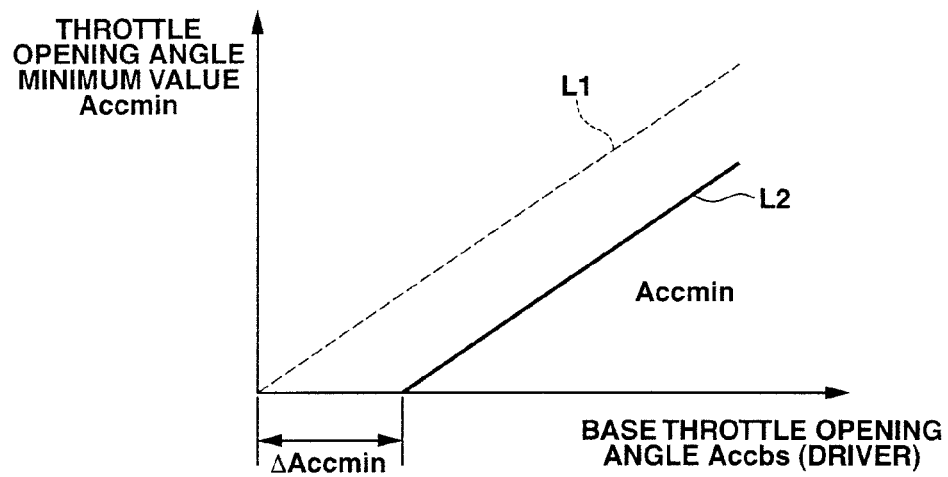
FIGS. 23A, 23B, and 23C are examples of control maps used in another example of the sixth embodiment.

In FIGS. 22A through 22C, gain Kacc to calculate minimum value Accmin is varied in accordance with road surface frictional coefficient μ and the gear position. However, a basic relation L1 between base throttle opening angle Accbs (driver) and minimum value Accmin in accordance with the driver's accelerator pedal manipulation as denoted by a dot line in FIG. 23A is offset in a direction the relation becomes smaller in accordance with road surface frictional coefficient μ and the gear position. Then, in accordance with a post offset relation L2, minimum value Accmin may be updated in accordance with base throttle opening angle Accbs (driver) calculated sequentially.

Figure 23B:
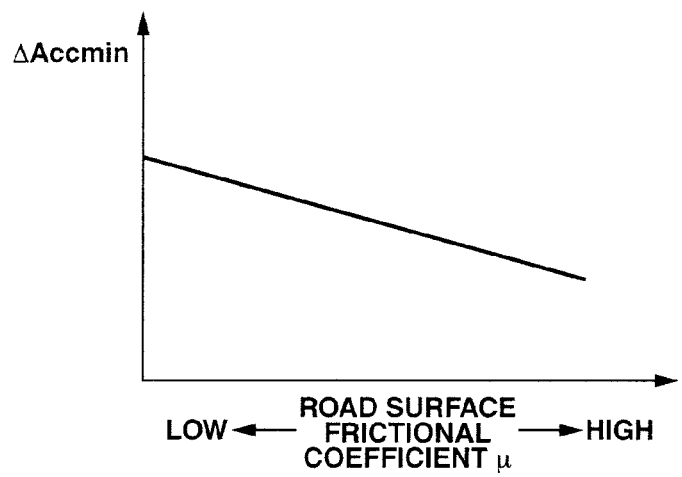
Figure 23C:
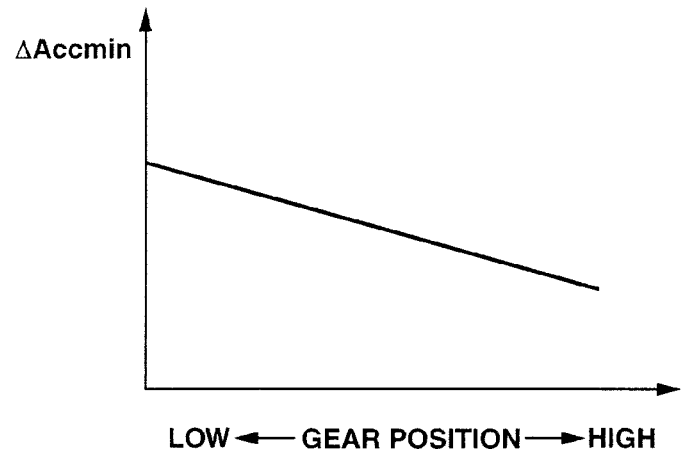

At this time, an offset quantity ΔAccmin may be previously arbitrarily set fixed value. In addition, as shown in FIG. 23B, offset quantity ΔAccmin may be set to be a smaller as road surface frictional coefficient μ becomes larger (higher) so that as road surface frictional coefficient μ becomes higher, minimum value Accmin becomes larger. As shown in FIG. 23C, as the gear position becomes higher, namely, as the shift ratio becomes smaller, offset quantity ΔAccmin may be set to be a smaller value. In this way, minimum value Accmin is offset so that, in a case where the accelerator pedal is manipulated in a region in which the driver manipulates or does not manipulate the decelerator pedal, for example, in a region in which the throttle opening angle is equal to or below 5%, minimum value Accmin is varied along with the variation in the depression quantity θth of the accelerator pedal, namely, along with the variation in base throttle opening angle Accbs (driver). Along with this variation in minimum value Accmin, target throttle opening angle Acc* is varied. Thus, a hunting of the throttle opening angle can be prevented. In other words, in a case where road surface frictional coefficient μ is low and the vehicular motion variation is easy to occur along with the variation in throttle opening angle or in a case where the gear position is low and the torque of the drive axle is easy to be transmitted so that the vehicular motion variation is easy to occur along with the variation of the throttle opening angle, offset quantity ΔAccmin becomes large. Even if a rough manipulation is carried out, the hunting of the throttle opening angle due to the variation in minimum value Accmin can be avoided. The vehicular motion variation can be suppressed.

It is noted that, in the sixth embodiment, minimum value Accmin is set on the basis of road surface frictional coefficient μ or the gear position. Minimum value Accmin may be set in a combination of these parameters, By carrying out this, minimum value Accmin may be set with the plurality of conditions such as road surface frictional coefficient μ and the gear position taken into consideration. Minimum value Accmin may be set in accordance with an actual traveling state. In addition, the fifth or sixth embodiment is applied to the first embodiment. However, the present invention is not limited to this. The fifth or sixth embodiment may be combined with any of the second through fourth embodiments.

The entire contents of Japanese Patent Applications No. 2004-077033 (filed in Japan on Mar. 17, 2004) and No. 2004-073125 (filed in Japan on Mar. 15, 2004) are herein incorporated by reference. The scope of the invention is defined with reference to the following claims.

What is claimed is:

1. A deceleration control apparatus for an automotive vehicle, comprising:
    a deceleration controlling section configured to set a target vehicle speed in accordance with a turning travel situation of the vehicle in order for a vehicle speed to become equal to the target vehicle speed, and configured to perform a deceleration control, wherein a deceleration required in the deceleration control is obtained through a control of a braking fluid pressure for wheel cylinders of respective road wheels;
    a throttle opening angle controlling section configured to control an engine throttle opening angle; and
    an accelerator manipulated variable detecting section configured to detect an accelerator manipulated variable by a vehicle driver,
    wherein the throttle opening angle controlling section is configured to control the throttle opening angle such that the throttle opening angle is decrementally reduced by a predetermined quantity in a closure direction when starting the deceleration control by the deceleration controlling section, the predetermined quantity being an amount which does not give an unpleasant feeling to a vehicular occupant;
    wherein the throttle opening angle controlling section is configured to control the throttle opening angle such that the throttle opening angle is recovered to a throttle opening angle corresponding to the accelerator manipulated variable detected by the accelerator manipulated variable detecting section at a variation degree when the brake fluid pressure control by the deceleration controlling section is ended, wherein the variation degree corresponds to a variation quantity of the target vehicle speed, wherein the variation degree becomes larger as the variation quantity of the target vehicle speed becomes larger.

2. A deceleration control apparatus for an automotive vehicle as claimed in claim 1, further comprising a predetermined quantity setting section configured to set the predetermined quantity of a throttle valve in a closure direction in accordance with a traveling situation of the vehicle.

3. A deceleration control apparatus for an automotive vehicle as claimed in claim 2, further comprising a road surface frictional coefficient detecting section configured to detect a road surface fictional coefficient of a road surface on which the vehicle is traveling and wherein the predetermined quantity setting section is configured to set the predetermined quantity in such a manner that as the road surface frictional coefficient detected by the road surface frictional coefficient detecting section becomes higher, the predetermined quantity becomes larger.

4. A deceleration control apparatus for an automotive vehicle as claimed in claim 2, wherein the deceleration controlling section is configured to set a target deceleration in accordance with the turning travel situation of the vehicle and to perform the deceleration control to achieve target deceleration and the predetermined quantity setting section is configured to set the predetermined quantity in such a manner that as the target deceleration becomes larger, the predetermined quantity becomes larger.

5. A deceleration control apparatus for an automotive vehicle as claimed in claim 2, further comprising an accelerator manipulated variable detecting section configured to detect a manipulated variable of an accelerator pedal and wherein the predetermined quantity setting section is configured to set the predetermined quantity in such a manner that as the manipulated variable of the accelerator pedal detected by the accelerator manipulated variable detecting section becomes larger, the predetermined quantity becomes larger.

6. A deceleration control apparatus for an automotive vehicle as claimed in claim 2, further comprising a driving force controlling section configured to control an engine throttle opening angle and configured to perform a driving force control to develop a required driving force specified and wherein the predetermined quantity setting section is configured to set the predetermined quantity in such a manner that as the required driving force becomes larger, the predetermined quantity becomes larger.

7. A deceleration control apparatus for an automotive vehicle as claimed in claim 1, further comprising an accelerator manipulated variable detecting section configured to detect a manipulated variable of an accelerator pedal and wherein the throttle opening angle controlling section is configured to set the first predetermined quantity to be larger as the manipulated variable of the accelerator pedal detected by the accelerator manipulated variable detecting section becomes larger.

8. A deceleration control apparatus for an automotive vehicle as claimed in claim 7, further comprising a driving force controlling section configured to control an engine throttle opening angle and to perform a driving force control to develop a specified required driving force and wherein the throttle opening angle controlling section is configured to set the first predetermined quantity in such a manner that as the required driving force becomes larger, the first predetermined quantity becomes larger.

9. A deceleration control apparatus for an automotive vehicle as claimed in claim 1, further comprising a recovery predetermined quantity setting section configured to set the predetermined quantity of the throttle opening angle in a recovery direction in accordance with a traveling situation of the vehicle.

10. A deceleration control apparatus for an automotive vehicle as claimed in claim 9, further comprising a road surface frictional coefficient detecting section configured to detect a road surface frictional coefficient of a road surface on which the vehicle is traveling and wherein the recovery predetermined quantity setting section is configured to set the predetermined quantity in such a manner that as the road surface frictional coefficient becomes higher, the predetermined quantity becomes larger.

11. A deceleration control apparatus for an automotive vehicle as claimed in claim 9, wherein the deceleration controlling section is configured to set a target vehicle speed in accordance with the turning travel situation of the vehicle and to perform the deceleration control for a traveling speed of the vehicle to be coincident with target vehicle speed and wherein the recovery predetermined quantity setting section is configured to set the predetermined quantity in such a manner that as an increase rate of the target vehicle speed set by the deceleration controlling section becomes larger, the predetermined quantity is set to be a larger value.

12. A deceleration control apparatus for an automotive vehicle as claimed in claim 1, wherein the throttle opening angle controlling section is configured to control the throttle opening angle to a preset minimum opening angle by the predetermined quantity.

13. A deceleration control apparatus for an automotive vehicle as claimed in claim 12, further comprising a minimum opening angle setting section configured to set the minimum opening angle of a throttle valve in accordance with a traveling situation of the vehicle.

14. A deceleration control apparatus for an automotive vehicle as claimed in claim 13, further comprising an accelerator manipulated variable detecting section configured to detect a manipulated variable of an accelerator pedal and wherein the minimum opening angle setting section is configured to set the minimum opening angle in accordance with the manipulated variable of the accelerator pedal detected by the accelerator manipulated variable detecting section.

15. A deceleration control apparatus for an automotive vehicle as claimed in claim 14, wherein the minimum opening angle setting section is configured to set the minimum opening angle to a preset constant value when the manipulated variable of the accelerator pedal is larger than a preset threshold value and to set the minimum opening angle to a value smaller than the constant value when the manipulated variable of the accelerator pedal is equal to or smaller than the preset threshold value.

16. A deceleration control apparatus for an automotive vehicle as claimed in claim 15, further comprising a road surface frictional coefficient detecting section configured to detect a road surface frictional coefficient of a road surface on which the vehicle is traveling and wherein the minimum opening angle setting section is configured to set the constant value to a larger value as the road surface frictional coefficient detected by the road surface frictional coefficient detecting section becomes higher.

17. A deceleration control apparatus for an automotive vehicle as claimed in claim 15, wherein the minimum opening angle setting section is configured to set the constant value to a larger value as a shift ratio of a transmission becomes smaller.

18. A deceleration control apparatus for an automotive vehicle as claimed in claim 14, wherein the minimum opening angle setting section is configured to set the minimum opening angle to a larger value as the manipulated variable of the accelerator pedal becomes larger.

19. A deceleration control apparatus for an automotive vehicle as claimed in claim 18, further comprising a road surface frictional coefficient detecting section configured to detect a road surface frictional coefficient of a road surface on which the vehicle is traveling and wherein the minimum opening angle setting section is configured to set the minimum opening angle to a larger value as the road surface frictional coefficient becomes higher.

20. A deceleration control apparatus for an automotive vehicle as claimed in claim 18, wherein the minimum opening angle setting section is configured to set the minimum opening angle to be a larger value as a shift ratio of a transmission becomes smaller.

21. A deceleration control apparatus for an automotive vehicle as claimed in claim 18, wherein the minimum opening angle setting section is configured to set the minimum opening angle to a complete closure state when the manipulated variable of the accelerator pedal is equal to or lower than a preset threshold value.

22. A deceleration control apparatus for an automotive vehicle as claimed in claim 21, further comprising a road surface frictional coefficient detecting section configured to detect a road surface frictional coefficient of a road surface on which the vehicle is traveling and wherein the minimum opening angle setting section is configured to set the threshold value to a larger value as the road surface frictional coefficient detected by the road surface frictional coefficient detecting section becomes lower.

23. A deceleration control apparatus for an automotive vehicle as claimed in claim 21, wherein the minimum opening angle setting section is configured to set the threshold value to be a larger value as a shift ratio of a transmission becomes larger.

24. A deceleration control apparatus for an automotive vehicle as claimed in claim 1, wherein the deceleration controlling section is configured to perform deceleration control while a driver of the vehicle is pressing an accelerator pedal of the vehicle.

* * * * *